US011373242B2

(12) United States Patent
Kapur et al.

(10) Patent No.: US 11,373,242 B2
(45) Date of Patent: Jun. 28, 2022

(54) OPTIMIZATION PROCESSOR FOR ELECTRONIC DATA MULTIPLE TRANSACTION REQUEST MESSAGES

(71) Applicant: Chicago Mercantile Exchange Inc., Chicago, IL (US)

(72) Inventors: Aditya Arun Kapur, Palatine, IL (US); Pearce Ian Peck-Walden, Chicago, IL (US); Arkadiusz Koziol, Glenview, IL (US); Manmathasivaram Nagarajan, Chicago, IL (US); James Allen Bailey, Western Springs, IL (US); Dileep Chakravarthi Konduru, Schaumburg, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 696 days.

(21) Appl. No.: 15/637,877

(22) Filed: Jun. 29, 2017

(65) Prior Publication Data
US 2019/0005582 A1 Jan. 3, 2019

(51) Int. Cl.
*G06Q 40/04* (2012.01)
*G06Q 40/06* (2012.01)

(52) U.S. Cl.
CPC ............ *G06Q 40/06* (2013.01); *G06Q 40/04* (2013.01)

(58) Field of Classification Search
CPC .............................. G06Q 40/04; G06Q 40/06
(Continued)

(56) References Cited

U.S. PATENT DOCUMENTS 7,039,610 B2 5/2006 Morano et al.
7,734,538 B2 6/2010 Bauerschmidt et al.
(Continued)

FOREIGN PATENT DOCUMENTS

JP 2004523019 A * 7/2004 ............. G06Q 40/04

OTHER PUBLICATIONS https://reader.elsevier.com/reader/sd/pii/S2210650217301268?token=8915E7FD832762361019B1E223DE51844F8D466CD6A26C93439C9792DD2F95D3F9E1BEEE05EF5E83E1FDC4A84B450726 on maximizing reliability of grid transaction processing system considering balanced task allocation using social spider optimization (Year: 2017).*

(Continued)

*Primary Examiner* — Hani M Kazimi
(74) *Attorney, Agent, or Firm* — Lempia Summerfield Katz LLC

(57) ABSTRACT

A optimization processor in a data transaction processing system receives an electronic data multiple transaction request message including multiple electronic data transaction requests, and determines whether some of the electronic data transaction requests should be routed through or bypass transaction integrity modules designed to detect and mitigate undesirable object conditions. The optimization processor may also determine whether some of the electronic data transaction requests should be routed through or bypass transaction processing modules designed to match or attempt to match electronic data transaction requests. The optimization processor may, in one embodiment, rely upon previous decisions made by the modules. The optimization processor may also access data structures storing information about a current environment state to determine whether an electronic data transaction request should be routed
(Continued)

through the time consuming transaction integrity and transaction processing modules.

17 Claims, 19 Drawing Sheets

(58) Field of Classification Search
USPC .......................................................... 705/37
See application file for complete search history.

(56) References Cited

U.S. PATENT DOCUMENTS

| | | |
|---|---|---|
| 7,831,491 B2 | 11/2010 | Newell et al. |
| 7,853,499 B2 | 12/2010 | Czupek et al. |
| 8,103,576 B2 | 1/2012 | Farrell et al. |
| 8,112,347 B2 | 2/2012 | Farrell et al. |
| 8,229,820 B2 | 7/2012 | Newell et al. |
| 8,341,056 B2 | 12/2012 | Newell et al. |
| 8,560,443 B2 | 10/2013 | Newell et al. |
| 8,626,625 B2 | 1/2014 | Newell et al. |
| 8,660,936 B1 | 2/2014 | Banke et al. |
| 8,732,065 B1* | 5/2014 | Hayes, Jr. ............... G06Q 30/06 709/224 |
| 8,924,278 B2 | 12/2014 | Farrell et al. |
| 9,659,330 B2 | 5/2017 | Newell et al. |
| 11,321,778 * | 5/2022 | Farnstrom .............. G06Q 40/04 |
| 2004/0193530 A1* | 9/2004 | Hausman ............... G06Q 40/04 705/37 |
| 2005/0096999 A1 | 5/2005 | Newell et al. |
| 2005/0108141 A1 | 5/2005 | Farrell et al. |
| 2005/0203826 A1 | 9/2005 | Farrell et al. |
| 2008/0027848 A1* | 1/2008 | Olsson ................... G06Q 40/00 705/37 |
| 2010/0250425 A1* | 9/2010 | Sweeting ............... G06Q 40/04 705/37 |
| 2014/0006243 A1* | 1/2014 | Boudreault ............ G06Q 40/04 705/37 |
| 2014/0019329 A1 | 1/2014 | Newell et al. |
| 2014/0089164 A1 | 3/2014 | Newell et al. |
| 2014/0143123 A1 | 5/2014 | Banke et al. |
| 2015/0012401 A1* | 1/2015 | Olsson ................... G06Q 40/04 705/37 |
| 2015/0073962 A1 | 3/2015 | Bixby et al. |
| 2015/0088720 A1 | 3/2015 | Acuna-Rohter et al. |
| 2015/0088723 A1 | 3/2015 | Acuna-Rohter et al. |
| 2015/0127513 A1 | 5/2015 | Studnitzer et al. |
| 2015/0127516 A1 | 5/2015 | Studnitzer et al. |
| 2015/0161727 A1 | 6/2015 | Callaway et al. |
| 2016/0110806 A1* | 4/2016 | Bent ...................... G06Q 40/04 705/37 |
| 2016/0328796 A1 | 11/2016 | Acuna-Rohter et al. |

OTHER PUBLICATIONS https://apps.dtic.mil/sti/citations/ADA068160 A Dynamic Priority Scheduling Rule with Optimization for Transaction Processing Systems. (Year: 1979).*

Weber, B. W. (1991). Information technology and securities markets: Feasibility and desirability of alternative electronic trading systems (Order No. 9125774). Retrieved from https://dialog.proquest.com/professional/docview/303941488?accountid=131444 (Year: 1991).*

Mass Order Cancel, CME, Downloaded on Jun. 27, 2017, 9 pages, http://www.cmegroup.com/confluence/display/EPICSANDBOX/Mass+Order+Cancel.

Mass Quotes, CME, Downloaded on Jun. 27, 2017, 2 pages, http://www.cmegroup.com/confluence/display/EPICSANDBOX/Mass+Quotes.

Extended European Search Report, from EP Application No. 18180998, dated Dec. 7, 2018, EP.

* cited by examiner

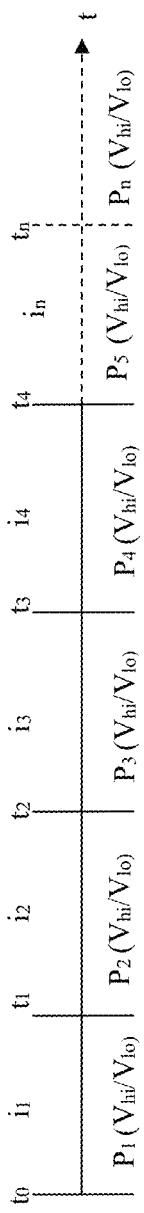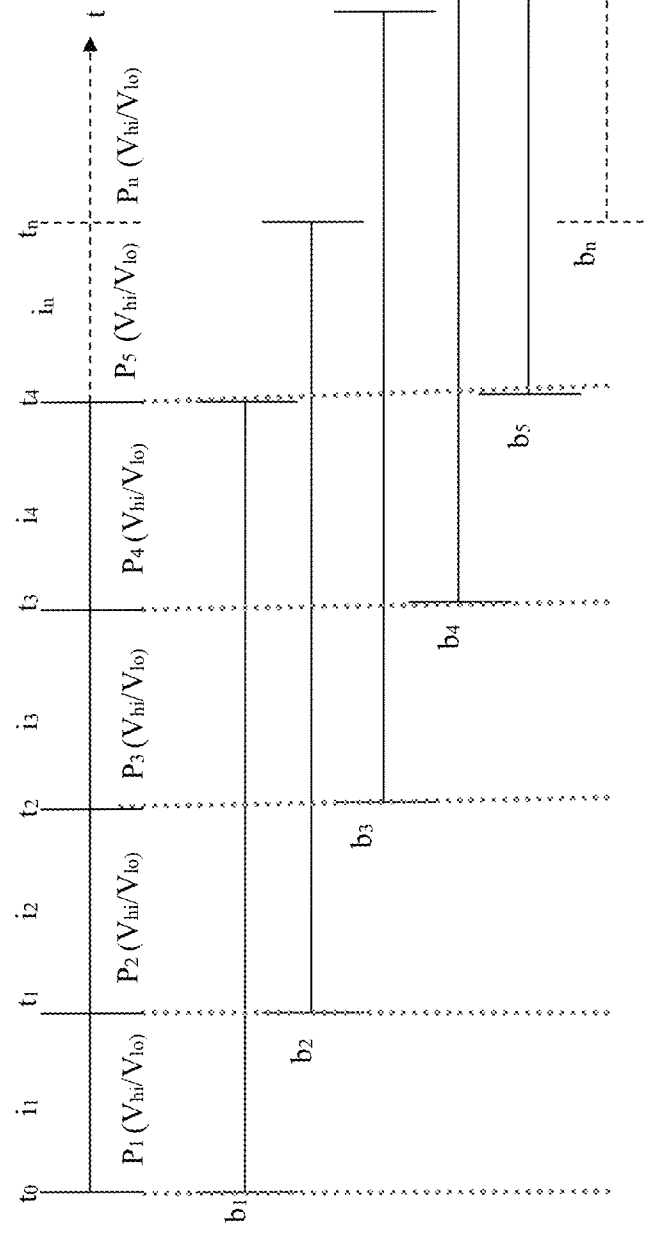
FIG. 9A
FIG. 9B

OPTIMIZATION PROCESSOR FOR ELECTRONIC DATA MULTIPLE TRANSACTION REQUEST MESSAGES

BACKGROUND

Computing systems, such as data transaction processing systems, often process data objects which are associated with values derived from or otherwise submitted or provided by external sources. Incoming messages related to the data objects may include requests for transactions which are triggered by, or otherwise perform actions on, the data objects at specified values. Whether or not the attempted actions are executed or performed depend in part on the values submitted with the incoming messages and/or the rules and processing routines programmed into a data transaction processing system.

One example of an environment including data objects having specified values is an electronic trading system wherein the values may be submitted by participants, e.g. traders. Electronic trading systems include objects having values associated therewith. Object values may change over time, and some changes to the value of an object may be undesirable or based on incomplete or inaccurate data. Some integrity systems prevent undesirable changes in values over time or undesirable gaps between reference and received or incoming values.

However, such integrity systems add additional processing overhead, increasing the overall processing times and overall latency of a data transaction processing system. Modern data transaction processing systems process thousands, hundreds of thousands, or even millions of messages or transaction requests per day. Routing each message or transaction request through integrity systems can create a bottleneck, creating latency and adversely affecting processing speeds.

BRIEF DESCRIPTION OF THE DRAWINGS

FIGS. 9A and 9B depicts representations of the operation of transaction integrity modules.

DETAILED DESCRIPTION

Figure 1:
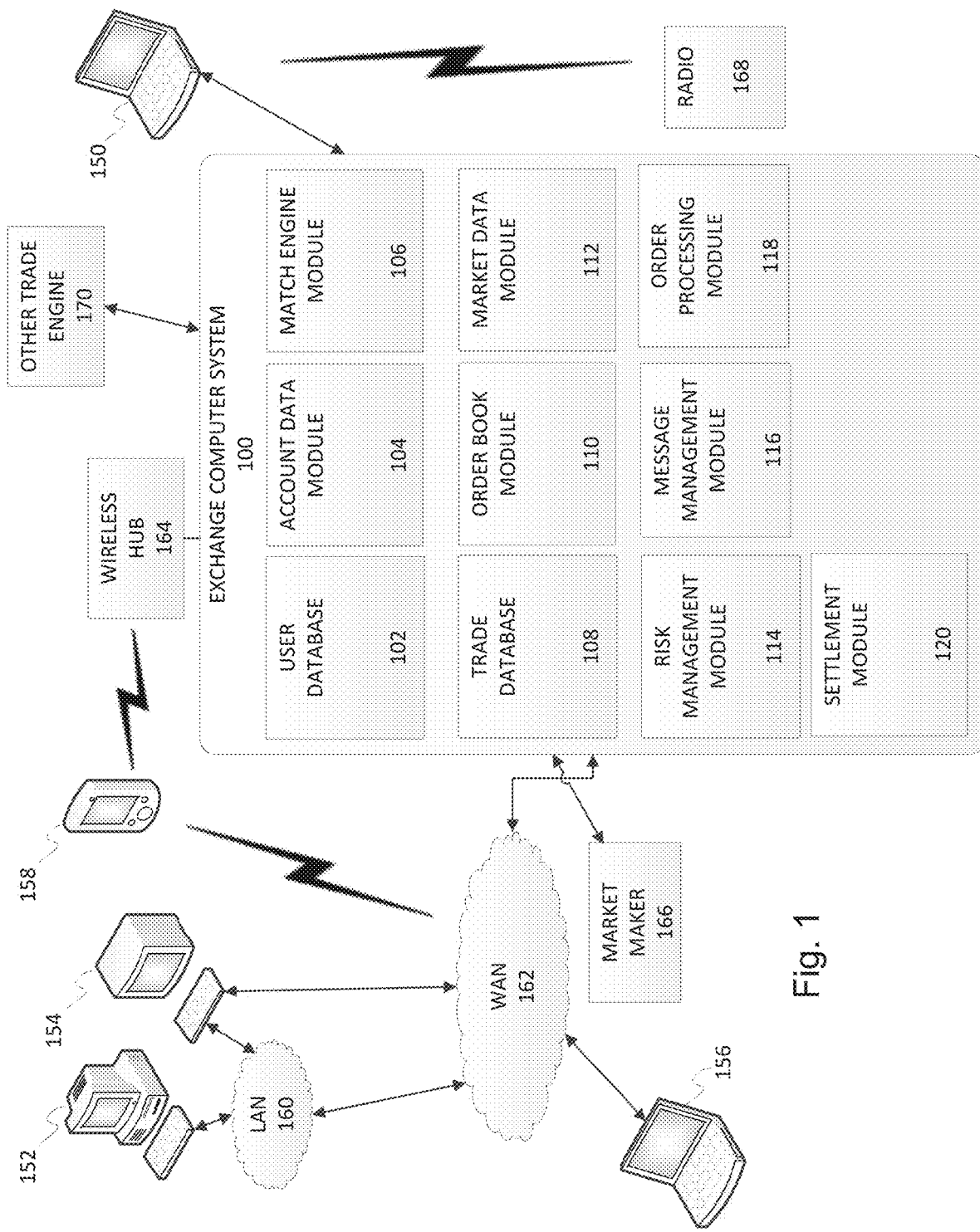
FIG. 1 depicts a computer network system, according to some embodiments.

The disclosed embodiments relate generally to a data communications system/network, for use by a data transaction processing system, which includes an optimization processor for rapidly determining whether a new order type, an electronic data multiple transaction request message, received by the data transaction processing system and related to data objects should be routed through, or instead bypass, transaction integrity modules designed to detect and mitigate undesirable object conditions, as well as whether the message contents should be routed through, or instead bypass, transaction processing modules. Transaction integrity modules, as well as transaction processing modules, may significantly increase the processing times of an exchange computing system, thereby reducing the volume of, and/or slowing the rate at which, messages may be processed by the electronic trading system.

The optimization processor may, in one embodiment, operate in a stateful manner, i.e., rely upon previous decisions made by the data transaction processing system. The optimization processor may also access data structures storing information about a current environment state to determine whether a new transaction request should be routed through the transaction integrity modules, thereby incurring the additional processing time thereof, or whether a transaction request matches previously received but unsatisfied transaction requests, thereby incurring the additional processing time of a transaction processor module pipeline.

The disclosed embodiments thus may be coupled with, but operate independently of, the transaction integrity modules and/or order book objects that, when utilized, typically may significantly increase transaction processing times.

As noted above, the disclosed embodiments also relate generally to an electronic data multiple transaction request message that comprises multiple electronic data transaction requests, as well as to the optimization processor for the electronic data multiple transaction request message. In one embodiment, the multiple electronic data transaction requests in an electronic data multiple transaction request message are sorted by value for each type, so that the optimization processor initially analyzes one of the electronic data transaction requests from the electronic data multiple transaction request message and optimizes processing of the other electronic data transaction requests based on the initially analyzed electronic data transaction request.

The data transaction processing system, in one embodiment, also minimizes the amount of processing, e.g., due to the format of the electronic data multiple transaction request message and/or the optimized processing of the electronic data multiple transaction request message, performed on electronic data transaction requests in the same electronic data multiple transaction request message, thus reducing the computing load of a transaction integrity module and an order book module or match engine module of the data transaction processing system. In one embodiment, the data transaction processing system sorts the electronic data transaction requests as discussed herein in an electronic data multiple transaction request message to enable optimization of the electronic data multiple transaction request message by the optimization processor.

The disclosed embodiments also improve upon the technical field of networking by reducing the number of different messages transmitted to the exchange computing system. The disclosed system is a specific implementation and practical application of an optimization processor that determines when to bypass certain processing heavy, time consuming software modules.

As the number of orders and trades processed by an exchange computing system increases, electronic data transaction request messages used to submit orders and trades and transmitted to the exchange computing system can strain computer systems and networks that are used to transmit such messages. Moreover, the exchange computing system may include match engines that process the electronic data transaction request messages serially. A sender may submit multiple different orders at substantially the same time, but the sender's orders may not be processed together because other orders (from other senders) may intervene between orders transmitted from the same sender. The disclosed embodiments may, in one embodiment, improve user convenience by atomically processing electronic data transaction requests that are associated with the same electronic data multiple transaction request message.

At least some of the problems solved by the disclosed encoding system are specifically rooted in technology, e.g., electronic data transaction request messages that are transmitted to a data transaction processing system are each individually processed by modules, increasing a per-transaction request overhead, and are solved by means of a technical solution, e.g., grouping multiple electronic data transaction requests in an electronic data multiple transaction request message and utilizing one electronic data transaction request to potentially bypass processing of the other electronic data transaction requests, improving processing response times and the overall performance of the exchange computing system.

Accordingly, the resulting problem is a problem arising in computer systems due to the high volume, e.g., millions of electronic data transaction requests a day, received from multiple different submitters via different communications channels and processed by an exchange computing system. In cases where a sender may intend to submit a large group of the electronic data transaction requests together, the disclosed embodiments may optimize processing of a subset of the electronic data transaction requests that are all associated with a same sender or are associated with a common source, and may include a same common electronic data multiple transaction request message identifier.

When the optimization processor can avoid routing a message through a pipeline or route leading to a transaction integrity module, and/or to a transaction processing module, e.g., perform selective routing, the processing capacity, speed, and throughput of the exchange computing system may be increased, i.e., the processing capacity of the exchange computing system to process new transactions, while maintaining/ensuring transaction integrity, is maximized. The exchange computing system is accordingly improved and faster while still implementing the transaction integrity module and transaction processing logic when necessary and avoiding the additional processing burden when not necessary.

The solutions disclosed herein are, in one embodiment, implemented as automatic responses and actions by an exchange computing system computer.

The disclosed embodiments may, in one embodiment, implement a dual-pass process that enables users to specify that the electronic data transaction requests in an electronic data multiple transaction request message should be processed atomically as a group.

The disclosed embodiments may also increase user convenience by allowing users to submit laddered electronic data transaction requests, as discussed herein.

The disclosed embodiments may be directed to an exchange computing system that includes multiple hardware matching processors that match, or attempt to match, electronic data transaction requests with other electronic data transaction requests counter (or contra) thereto. Incoming electronic data transaction request messages (each one including one electronic data transaction request) or electronic data multiple transaction request messages (each one including multiple electronic data transaction requests) may be received from different client computers over a data communication network, and output electronic data transaction result messages may be transmitted to the client computers and may be indicative of results of the attempts to match incoming electronic data transaction requests.

The disclosed embodiments may be implemented in a data transaction processing system that processes data items or objects. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

For example, one exemplary environment where the disclosed embodiments may be desirable is in financial markets, and in particular, electronic financial exchanges, such as a futures exchange, such as the Chicago Mercantile Exchange Inc. (CME).

Exchange Computing System

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513 Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see the '513 Publication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-themarket of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
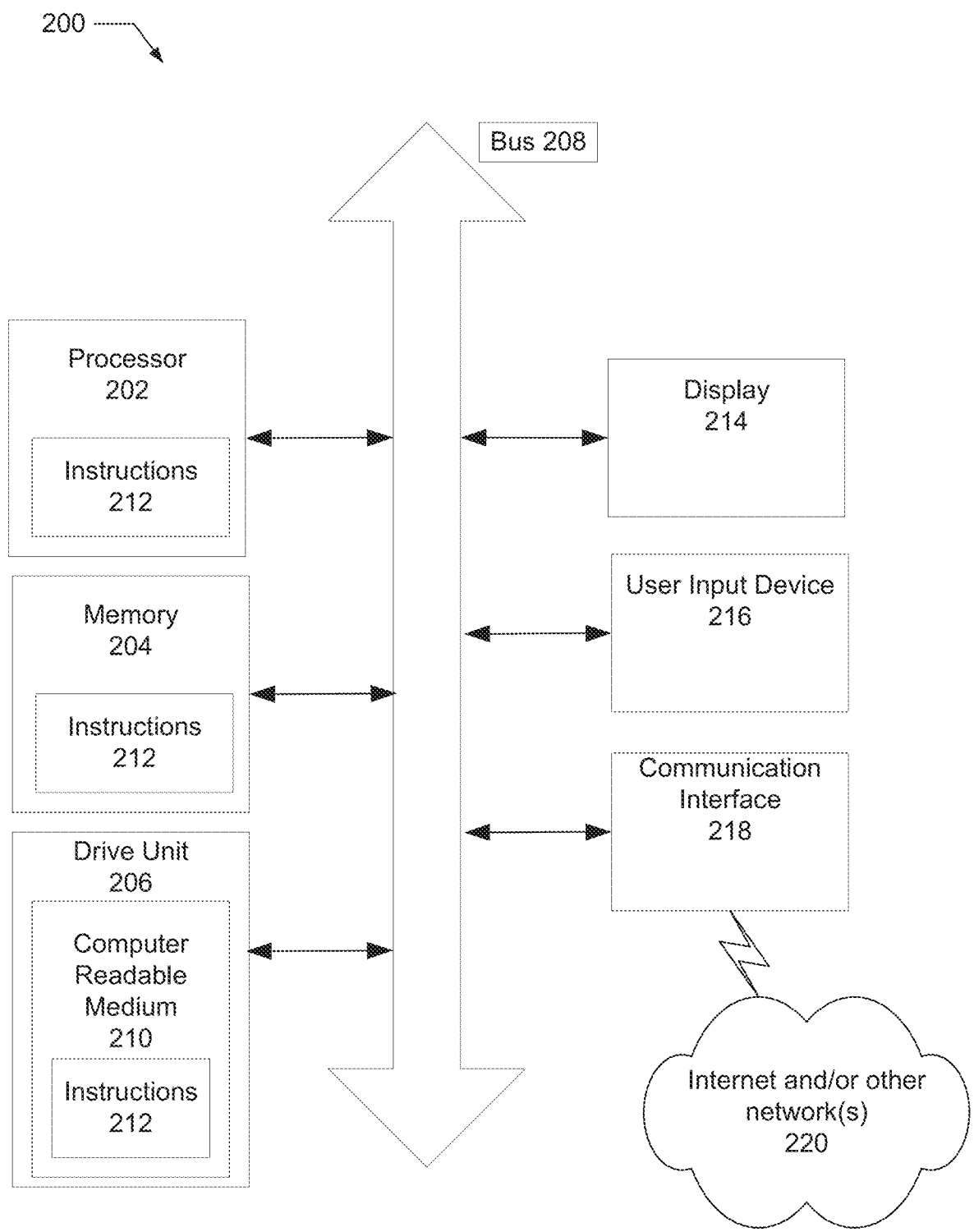
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described may herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other or secondary action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata.

For example, the Price Explicit Time trading policy is based on the basic Price Time trading policy with Explicit Orders having priority over Implied Orders at the same price level. The order of traded volume allocation at a single price level may therefore be: Explicit order with oldest timestamp first; followed by any remaining explicit orders in timestamp sequence (First In, First Out—FIFO) next; followed by implied order with oldest timestamp next; followed by any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is: 1. Extract all potential matching orders at best price from the order book into a list. 2. Sort the list by order size, largest order size first. If equal order sizes, oldest timestamp first. This is the matching list. 3. Find the 'Matching order size, which is the total size of all the orders in the matching list. 4. Find the 'tradable volume', which is the smallest of the matching volume and the volume left to trade on the incoming order. 5. Allocate volume to each order in the matching list in turn, starting at the beginning of the list. If all the tradable volume gets used up, orders near the end of the list may not get allocation. 6. The amount of volume to allocate to each order is given by the formula: (Order volume/Matching volume)*Tradable volume. The result is rounded down (for example, 21.99999999 becomes 21) unless the result is less than 1, when it becomes 1. 7. If tradable volume remains when the last order in the list had been allocated to, return to step 3. Note: The matching list is not re-sorted, even though the volume has changed. The order which originally had the largest volume is still at the beginning of the list. 8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is: 1. Extract all potential matching orders at best price from the order book into a list. 2. Sort the list by explicit time priority, oldest timestamp first. This is the matching list. 3. Find the 'Matching volume', which is the total volume of all the orders in the matching list. 4. Find the 'tradable volume', which is the smallest of the matching volume and the volume left to trade on the incoming order. 5. Allocate volume to each order in the matching list in turn, starting at the beginning of the list. 6. The amount of volume to allocate to each order is given by the formula: (Order volume/Matching volume)*Tradable volume. The result is rounded down to the nearest lot (for example, 21.99999999 becomes 21) unless the result is less than the defined threshold in which case it is rounded down to 0. 7. If tradable volume remains when the last order in the list had been allocated to, the remaining volume is allocated in time priority to the matching list. 8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore: 1. Priority order, if applicable. 2. Preference allocation, if applicable. 3. Price Time allocation of the configured percentage of incoming volume. 4. Threshold Pro-Rata allocation of any remaining incoming volume. 5. Final allocation of any leftover lots in time sequence. Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, which discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine may automatically adapt to the changing market conditions of a financial product, e.g., a limited life product, in a non-preferential manner, maintaining fair order allocation while improving market liquidity, e.g., over the life of the product.

In one implementation, the system may evaluate market conditions on a daily basis and, based thereon, change the matching algorithm between daily trading sessions, i.e., when the market is closed, such that when the market reopens, a new trading algorithm is in effect for the particular product. The system may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon.

Settlement price determination techniques may be implemented to cover calendar month spread instruments having different deferred month contracts.

Order Book Object Data Structures

Figure 3A:
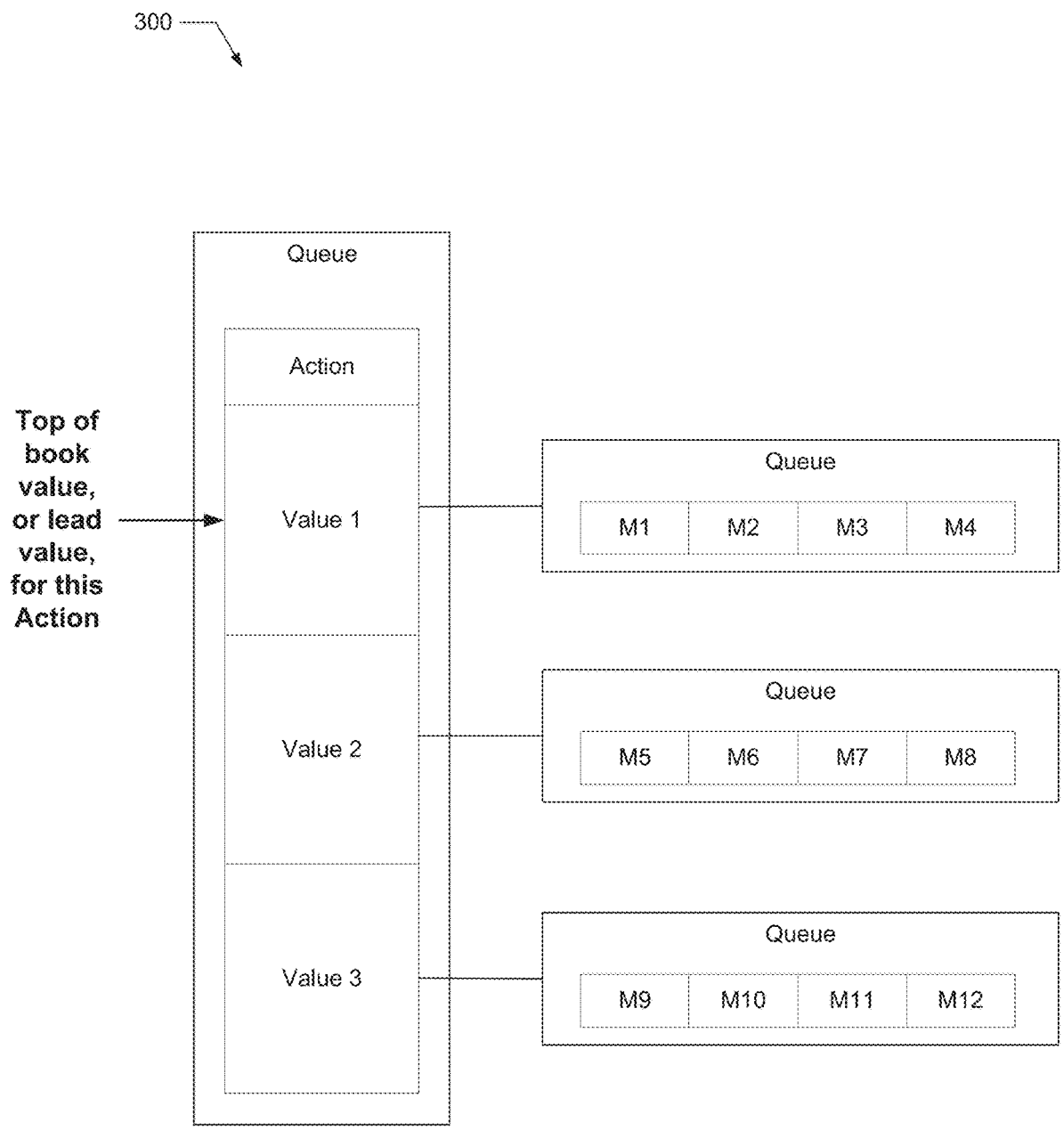
FIG. 3A depicts a storage data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

Figure 3B:
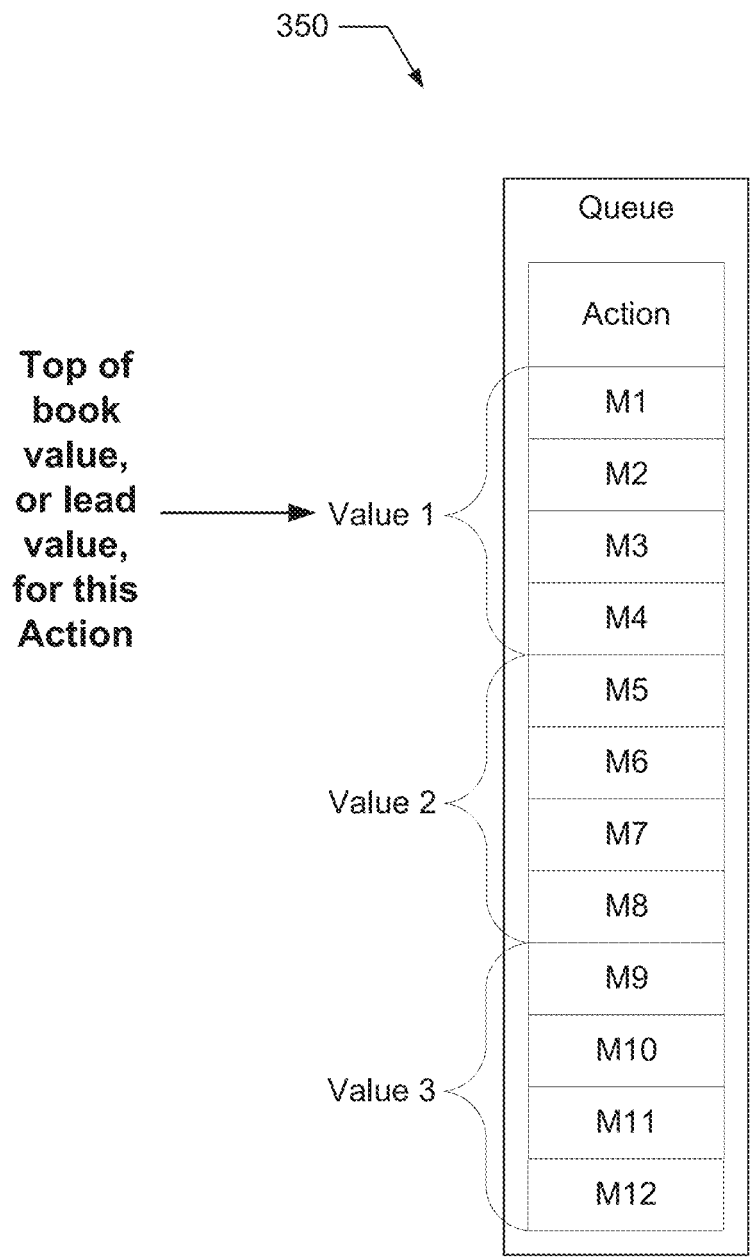
FIG. 3B depicts an alternative storage data structure, according to some embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

A lead acquisition value may be the best or lead value in an acquisition queue of an order book object, and a lead relinquish value may be the best or lead value in a relinquish queue of the order book object.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
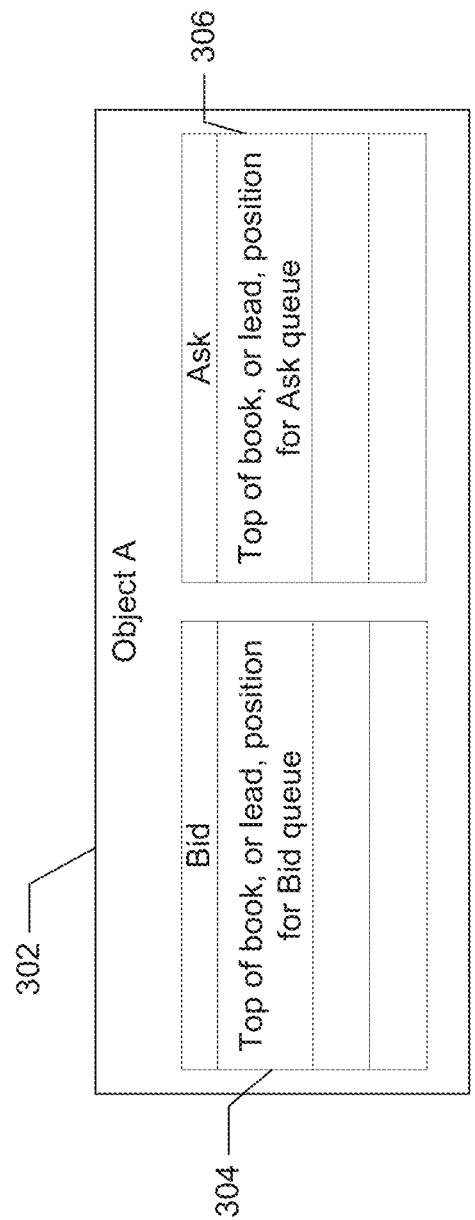
FIG. 3C depicts an order book data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4:
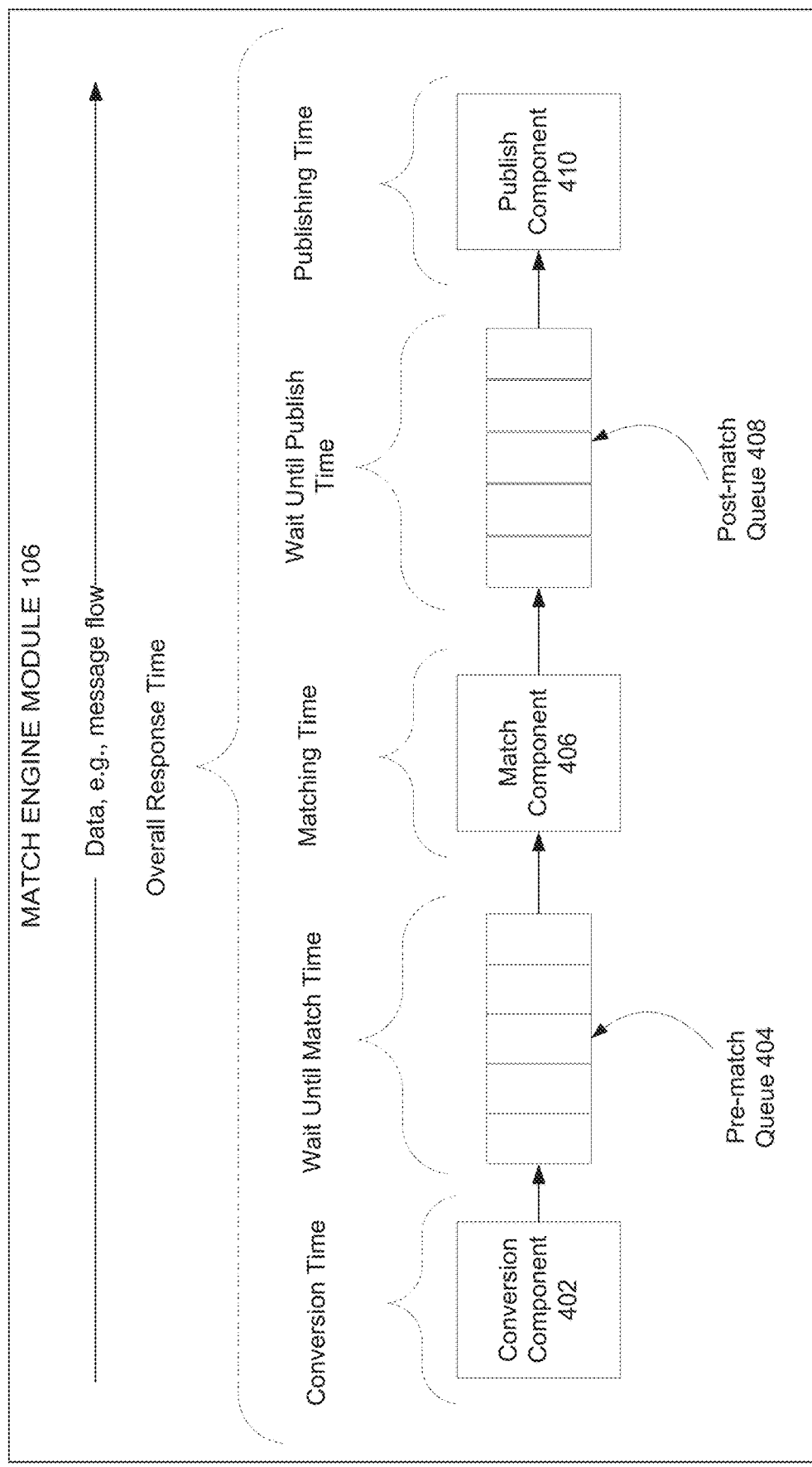
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publically viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

The speed at which trades are executed through electronic trading systems provide many benefits. Electronic trading systems can facilitate a large number of market transactions. The greater the number of market transactions, the greater a market's liquidity. In liquid markets, prices are driven by competition, prices reflect a consensus of an investment's value, and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

Such improved speed and efficiency also increases the speed at which problems may occur and propagate, such as where the market ceases to operate as intended, i.e., the market no longer reflects a true consensus of the value of traded products among the market participants. Such problems are typically evidenced by extreme market activity such as large and/or rapid changes in price, whether up or down, over a short period of time, or an extreme volume of trades taking place.

In particular, traders, whether human or electronic, may not always react in a rational manner, such as when presented with imperfect information, when acting in fraudulent or otherwise unethical manner, and/or due to faulty training or design. For example, while communications technologies may have improved, inequities in access to information and opportunities to participate still exist, which may or may not be in compliance with legislative, regulatory and/or ethical rules, e.g., some traders receive information before other traders, or some traders may be able to process received information and/or place trader orders more quickly than others. In many cases, irrational trader behavior may be triggered by a market event, such as a change in price, creating a feedback loop where the initial irrational reaction may then cause further market events, such as a continued price drop, triggering further irrational behavior and an extreme change in the price of the traded product in a short period of time. High speed trading exacerbates the problem as there may be little time for traders, or those overseeing them, to contemplate their reactions and/or take corrective action before significant losses may be incurred. Furthermore, improved communications among traders facilitates propagation of irrational behavior in one market to other markets as traders in those other markets react to the results of the irrational behavior.

To mitigate risk and ensure a fair and balanced market, electronic trading systems often provide mechanisms to rapidly detect and respond to situations where a market is not operating in a fair and balanced manner or otherwise where the market value is not reflective of a true consensus of the value of the traded products among the market participants. However, transaction integrity modules typically comprise intensive computing routines that increase latency and processing time to an exchange computing system.

Transaction integrity modules rapidly evaluate message values to determine whether newly received messages should be subject to market protecting integrity modules. For example, the disclosed embodiments may rely upon or leverage previous determinations to determine whether newly received messages should be processed through the transaction integrity module pipeline, or should instead bypass the transaction integrity module. When applied to electronic trading systems, the disclosed embodiments may be implemented as an optimization processor that continually and automatically processes incoming messages.

The transaction integrity modules associated with an exchange computing system scan for, rapidly detect and respond to extreme changes, either up ("spike") or down ("dip") in the market where a precipitous market move/change occurs. If an unacceptable message is detected, transaction integrity modules may respond by taking an action, e.g., a corrective or responsive action, such as notifying the operator of the exchange, such as the Global Control Center ("GCC") of the Chicago Mercantile Exchange ("CME"), placing the market in a paused or reserved state, described in more detail below, establishing permanent or temporary trade price limitations, or other actions, or combinations thereof, to mitigate the effects of the extreme change, so as to, for example, slow down the market or otherwise allow traders time to adequately analyze and react to market conditions, and subsequently submitting more messages/orders that can be used to better determine a true consensus.

In a futures market that has few resting orders but many stop orders, an order executed at a limit price can cause a cascading execution of buy or sell stop orders. The triggering and election of these stop orders can seem almost instantaneous lowering the value of a market in just a few seconds. A problem may occur when one or more trades bring many stop orders into the market. A fast execution of these stop orders may prevent opposite side orders from entering the market, preventing buyers from competing against other buyers and sellers from competing against other sellers. "Stop Price Logic" systems exist to handle extreme market changes due to an undesirable execution of stop orders. See, for example, U.S. Pat. Nos. 8,103,576 and 8,112,347 and U.S. Patent Publication No. 2005/0108141 A1, herein incorporated by reference in their entireties and relied upon.

Some systems focus on the speed of the movement of the market, and detect when a market for a particular product moves too quickly, either up or down, in too short a period of time, e.g., the velocity of the market exceeds a defined threshold limit. See, for example, U.S. Pat. No. 8,660,936, entitled "Detection and mitigation of effects of high velocity price changes" ("the '936 Patent"), the entire disclosure of which is incorporated by reference herein and relied upon.

U.S. patent application Ser. No. 15/091,763 entitled "Multi-Path Routing System Including An Integrity Mechanism", the entirety of which is incorporated by reference herein and relied upon, describes a routing system that rapidly determines whether messages received by a data transaction processing system related to data objects in a computing system should be routed through or bypass integrity modules designed to detect and mitigate undesirable object conditions.

Electronic Data Multiple Transaction Request Messages

Figure 5A:
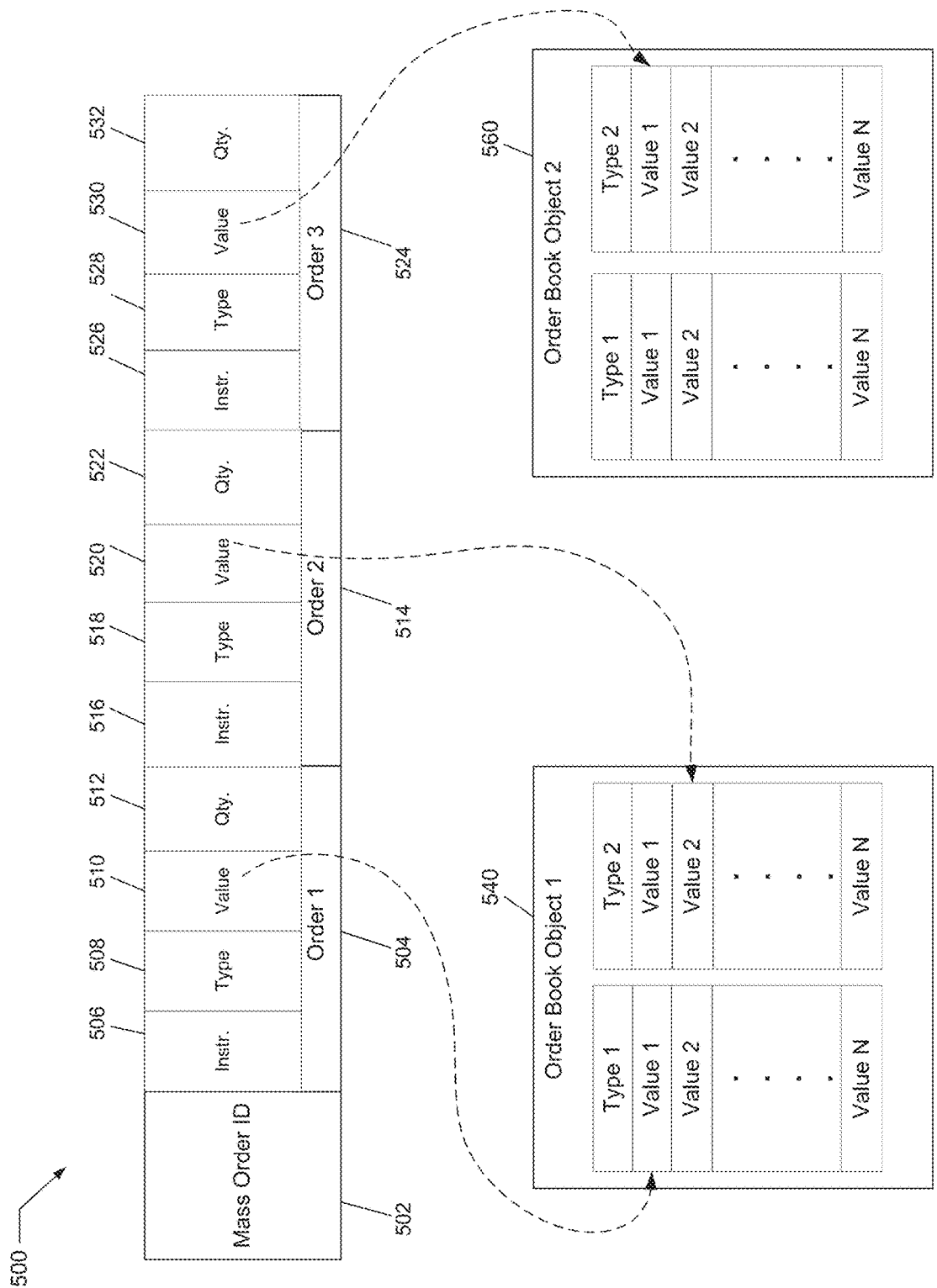
FIG. 5A depicts an example electronic data multiple transaction request message, according to some embodiments.

FIG. 5A illustrates an example electronic data multiple transaction request message 500, which includes multiple electronic data transaction requests 504 (order 1), 514 (order 2), and 524 (order 3). For example, each electronic data transaction request may be an order requesting the exchange computing system perform an action. The electronic data multiple transaction request message 500 may include a mass order ID field 502, which can be used to refer to the group of orders or electronic data transaction requests in electronic data multiple transaction request message 500. Each order, or electronic data transaction request, in electronic data multiple transaction request message 500 includes a financial instrument field (e.g., fields 506, 516, and 526 in orders 1, 2 and 3, respectively), a type field (e.g., fields 508, 518, and 528 in orders 1, 2 and 3, respectively), a value field (e.g., fields 510, 520, and 530 in orders 1, 2 and 3, respectively), and a quantity field (e.g., fields 512, 522, and 5326 in orders 1, 2 and 3, respectively).

When implemented in an exchange computing system that enables trading of financial instruments, the electronic data multiple transaction request message may be referred to as a mass order, and may include a mass order identifier, or a mass order ID field, e.g., field 502. In one embodiment, the electronic data multiple transaction request message prepared and submitted by the client computer may not include a mass order identifier. The exchange computing system, upon receipt of the electronic data multiple transaction request message, may detect that an incoming message is an electronic data multiple transaction request message (e.g., because it includes multiple different orders, or electronic data transaction requests), and assign a mass order identifier to the electronic data multiple transaction request message. Thus, the mass order ID may be assigned by the sender (e.g., the user associated with the sending client computer) prior to or upon transmission, or assigned by the exchange computing system upon receipt of the electronic data multiple transaction request message.

The electronic data multiple transaction request message includes different electronic data transaction requests that may be associated with different financial instruments, or may be associated with different values or prices for the same financial instrument. For example, FIG. 5A illustrates a data object 540, which represents order book object 1, and data object 560, which represents order book object 2.

Value 510 in order 1 and value 520 in order 2 both relate to different sides/types of order book object 1. Thus, orders 1 and 2 both relate to the same financial instrument, and may accordingly specify the same financial instrument in fields 506 and 516, respectively. For example, order 1 may be an electronic data transaction request to purchase (specified in field 508) a quantity (field 512) of a financial instrument (field 506) at a value (field 510), and order 2 may be an electronic data transaction request to relinquish (specified in field 518) a quantity (field 522) of the same financial instrument (specified in field 516) at a value (field 520). The same financial instrument may be associated with order book object 1. Thus, orders 1 and 2 both impact the same order book object 540. Orders 1 and 2 are for different sides of the same order book object and different values. In one embodiment, an electronic data multiple transaction request message may include orders impacting the same side of the same order book object, but be for different values/price levels. Order 3 may be an electronic data transaction request to transact upon (transaction type specified in field 528) a quantity (field 532) of a financial instrument (field 526) at a value (field 530), where order book object 2 (data object 560) is associated with the financial instrument specified in field 526.

The electronic data multiple transaction request message accordingly allows a trader to specify multiple electronic data transaction requests in the same electronic data multiple transaction request message (all linked by mass order id, field 502), where the electronic data transaction requests may be for different instruments or the same instrument, and may allow the trader to specify different values for the same financial instrument, e.g., either on the same side (e.g., one of buy or sell) or a different side (e.g., the other of buy or sell).

In one embodiment, the multiple electronic data transaction requests in an electronic data multiple transaction request message may be sorted by value for each type. For example, an electronic data multiple transaction request message may be in a format that includes positions that may be identifiable by a position code. For example, in FIG. 5A, fields 504, 514 and 524 may be associated with first, second and third positions, respectively, such that the optimization processor in an exchange computing system may read and process the first position first, the second position next, then the third position, and so on. As discussed herein, the optimization processor may initially read or process a value in the first position, and may determine whether or not messages in subsequent positions are processed by transaction integrity modules and/or transaction processing modules based on the results of reading or processing the value in the first position. The electronic data multiple transaction request message submitter's client computer, which is the computer that generates the electronic data multiple transaction request message, places the orders/values within the different positions of an electronic data multiple transaction request message. The electronic data multiple transaction request message's submitter ensures that the electronic data multiple transaction request message is properly formatted so as to be accepted and properly processed by the optimization processor.

In one embodiment, the orders/transaction requests within an electronic data multiple transaction request message are sorted by value for each transaction type from the electronic data transaction request associated with the best value to the electronic data transaction request associated with the worst value. For example, if an electronic data multiple transaction request message includes multiple electronic data transaction requests to relinquish the same financial instrument, the best value for the relinquish transaction type for that financial instrument in the electronic data multiple transaction request message is the smallest value out of all of the multiple electronic data transaction requests to relinquish the same financial instrument, and the worst value for the relinquish transaction type for that financial instrument in the electronic data multiple transaction request message is the largest value out of all of the multiple electronic data transaction requests to relinquish the same financial instrument. If an electronic data multiple transaction request message includes multiple electronic data transaction requests to acquire the same financial instrument, the best value for the acquire transaction type for that financial instrument in the electronic data multiple transaction request message is the largest value out of all of the multiple electronic data transaction requests to acquire the same financial instrument, and the worst value for the acquire transaction type for that financial instrument in the electronic data multiple transaction request message is the smallest value out of all of the multiple electronic data transaction requests to acquire the same financial instrument.

In one embodiment, the electronic data multiple transaction request message format may include all of the transaction requests for transactions of one type (e.g., acquire) grouped together (e.g., in consecutive positions in the electronic data multiple transaction request message) followed by all of the transaction requests for transactions of another type (e.g., relinquish) grouped together (e.g., in consecutive positions in the electronic data multiple transaction request message).

In one embodiment, the optimization processor may reject any electronic data multiple transaction request message where all of the acquire values (e.g., values associated with electronic data transaction requests requesting acquisition of a financial instrument) are not less than all of the relinquish values (e.g., values associated with electronic data transaction requests requesting relinquishing of the financial instrument).

In one embodiment, the electronic data multiple transaction request message may include a flag that indicates that the optimization processor should sort the transaction requests within an electronic data multiple transaction request message by type and value before the electronic data multiple transaction request message is processed as discussed herein.

Figure 5B:
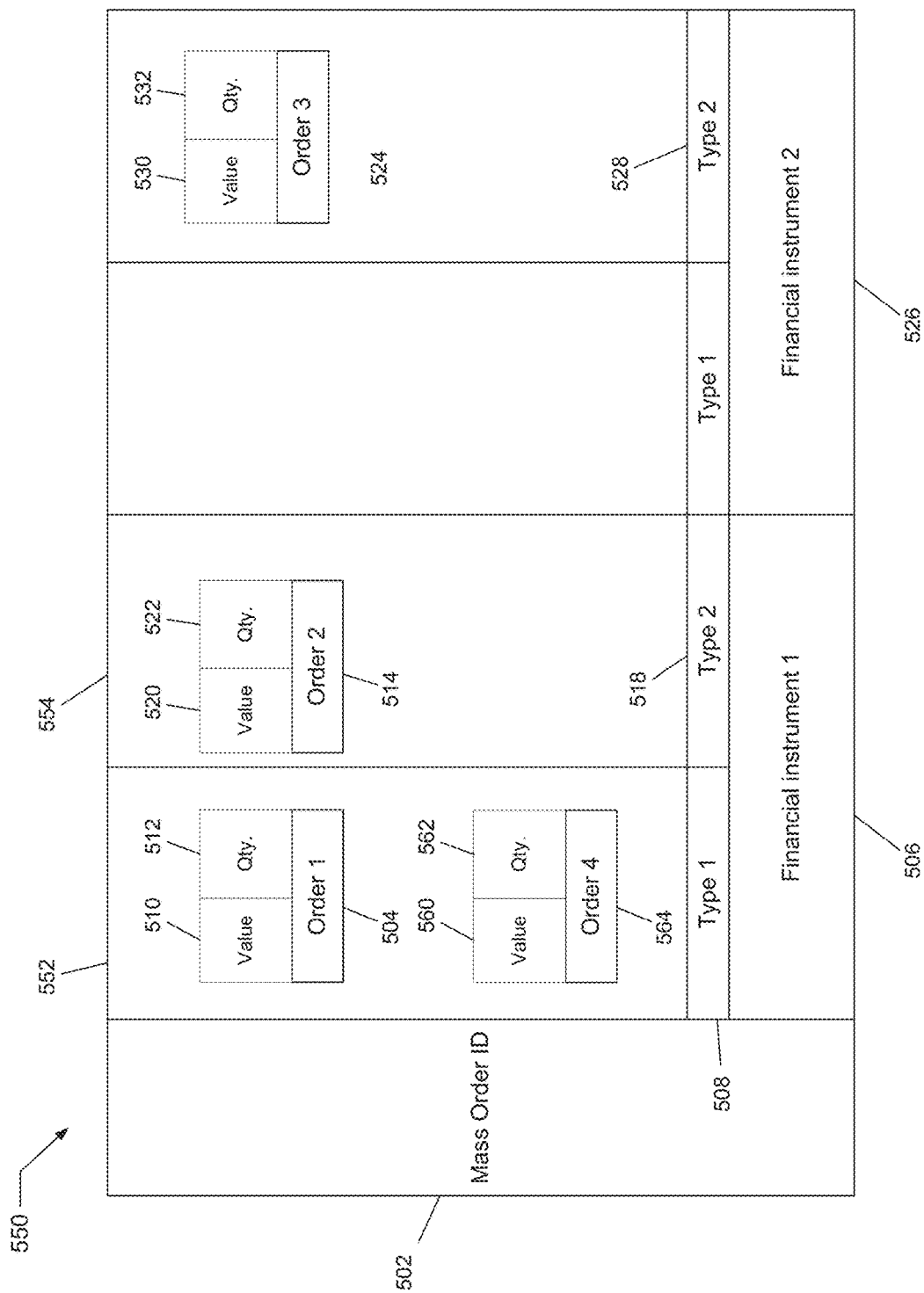
FIG. 5B depicts another example electronic data multiple transaction request message, according to some embodiments.

FIG. 5B illustrates another example electronic data multiple transaction request message 550. Electronic data multiple transaction request message 550 may be similar to electronic data multiple transaction request message 500, and elements in FIGS. 5A and 5B that are similar to each other may be referenced by the same reference numerals. Electronic data multiple transaction request message 550 enables multiple orders to be associated with the same financial instrument. Electronic data multiple transaction request message 550 also enables multiple orders to be associated with the same transaction type for the same financial instrument. For example, orders 1, 2 and 4 are all associated with financial instrument 1. Thus, each order does not need to specify the financial instrument associated with that order. Electronic data multiple transaction request message 550 accordingly reduces the number of fields necessary to represent orders 1, 2 and 4. In particular, compared to electronic data multiple transaction request message 500 illustrated in FIG. 5A, electronic data multiple transaction request message 550 does not need to include data associated with field 516. Moreover, orders 1 and 4 are for the same transaction type (e.g., type 1) for financial instrument 1. Thus, the same field, namely field 508, is used to specify the transaction type associated with both orders 1 and 4, reducing the number of fields and/or the amount of data, that would be otherwise necessary to represent orders 1 and 4.

It should be appreciated that reducing the amount of data necessary to represent orders, and thus the size of the messages transmitted to the exchange computing system, reduces the strain on the computers systems and networks used to transmit such messages, reducing the overall latency experienced by the transaction request submitters.

In one embodiment, implementing the electronic data multiple transaction request message reduces the amount and/or size of messages transmitted from client computers to the exchange computing system because multiple electronic data transaction requests can be included in a single electronic data multiple transaction request message. For example, data that is common to more than one electronic data transaction request (e.g., the transaction type associated with orders 1 and 4, as described in connection with FIG. 5B) may only needed to be included once in the electronic data multiple transaction request message, reducing the size of the data that is transmitted by a user's client computer to the exchange computing system, thus reducing the strain on computer systems and networks that are used to communicate information between client computers and the exchange computing system.

Optimization Processor

An exchange computing system, such as one implemented by the CME, may include an optimization processor that determines whether some (e.g., all but one) electronic data transaction requests in the same electronic data multiple transaction request message are submitted to transaction integrity modules and/or transaction processing modules.

The disclosed optimization processor may determine whether or not one of the incoming electronic data transaction requests (in particular, the electronic data transaction request associated with the best value from all of the electronic data transaction requests in the electronic data multiple transaction request message) will cause the integrity logic processing (e.g., value banding and velocity logic) of the transaction integrity modules to perform a corrective action. A corrective action, as discussed herein, by the transaction integrity modules may be to reject the transaction request that is checked by the transaction integrity module. A corrective action may be to halt processing of transaction requests for a predetermined amount of time. Based on determining how the best value will be processed by the transaction integrity modules, e.g., whether the best value will be rejected by the transaction integrity modules, the optimization module determines whether other electronic data transaction requests in the same electronic data multiple transaction request message are submitted to transaction integrity modules, or are instead also rejected by the exchange computing system, without having to actually submit the other electronic data transaction requests in the same electronic data multiple transaction request message to the transaction integrity modules. For example, the optimization processor may be in communication with a value banding module 152 and a velocity logic module 154 of an exchange computing system, which may collectively extract and analyze an electronic data transaction request to determine whether the transaction request will cause a corrective action, such as a rejection of the transaction request.

As discussed above, "better" than a reference value means lower than the reference value if the transaction is a purchase transaction, and higher than the reference value if the transaction is a sell transaction. Said another way, for purchase transactions, lower values are better, and for relinquish or sell transactions, higher values are better. As discussed above, for example, if an electronic data multiple transaction request message includes multiple electronic data transaction requests to relinquish the same financial instrument, the best value for the relinquish transaction type for that financial instrument in the electronic data multiple transaction request message is the smallest value out of all of the multiple electronic data transaction requests to relinquish the same financial instrument. If an electronic data multiple transaction request message includes multiple electronic data transaction requests to acquire the same financial instrument, the best value for the acquire transaction type for that financial instrument in the electronic data multiple transaction request message is the highest value out of all of the multiple electronic data transaction requests to acquire the same financial instrument.

The optimization processor may also additionally determine whether or not one of the incoming electronic data transaction requests (in particular, the electronic data transaction request associated with the best value from all of the electronic data transaction requests in the electronic data multiple transaction request message) would actually trade, or cause a match, e.g., with a resting order, and based on that determination, may determine whether other electronic data transaction requests in the same electronic data multiple transaction request message are submitted to transaction processing modules. For example, the optimization processor may be in communication with a message management module 140, an order extraction module 146, and/or order processing module 136 of an exchange computing system, which may collectively extract and analyze an electronic data transaction request and execute an instruction or action included therewith, including determining whether the transaction request will cause or be involved in a match event.

Accordingly, if the optimization processor determines that the best value for a transaction type in an electronic data multiple transaction request message will not pass the transaction integrity modules' integrity logic processing, or will not match with a previously received but unsatisfied transaction request, the optimization processor avoids further processing (such as by the transaction integrity modules or the transaction processing modules) of the other transaction requests in the same electronic data multiple transaction request message. The disclosed optimization processor accordingly reduces, in many instances, the processing of the other (i.e., non-best) electronic data transaction requests in an electronic data multiple transaction request message based on the results of processing the best electronic data transaction request for each transaction type via one or more of the transaction integrity modules or the transaction processing modules.

Some of the processing, which may be avoided due to the implementation of the optimization processor, may include having to determine whether a transaction request fully trades (e.g., whether all of the requested quantity of the order is satisfied/matches) or partially trades (e.g., whether only some of the quantity is satisfied/matches and the remaining quantity rests on the book to await a subsequent suitable counter order), and having to determine the trade prices (as opposed to the limit or submitted price) at which quantities will match or trade.

For example, referring to FIG. 5A, the optimization processor may be able to determine whether Orders 2 and 3 (e.g., the non-best electronic data transaction request values) are processed by computer intensive transaction integrity modules and transaction processing modules based on information related to Order 1 (e.g., the best electronic data transaction request value, because it is in the first position in the sorted electronic data transaction requests), allowing the exchange computing system in many instances to minimize the overall processing performed, conserving computing time and resources.

Figure 6A:
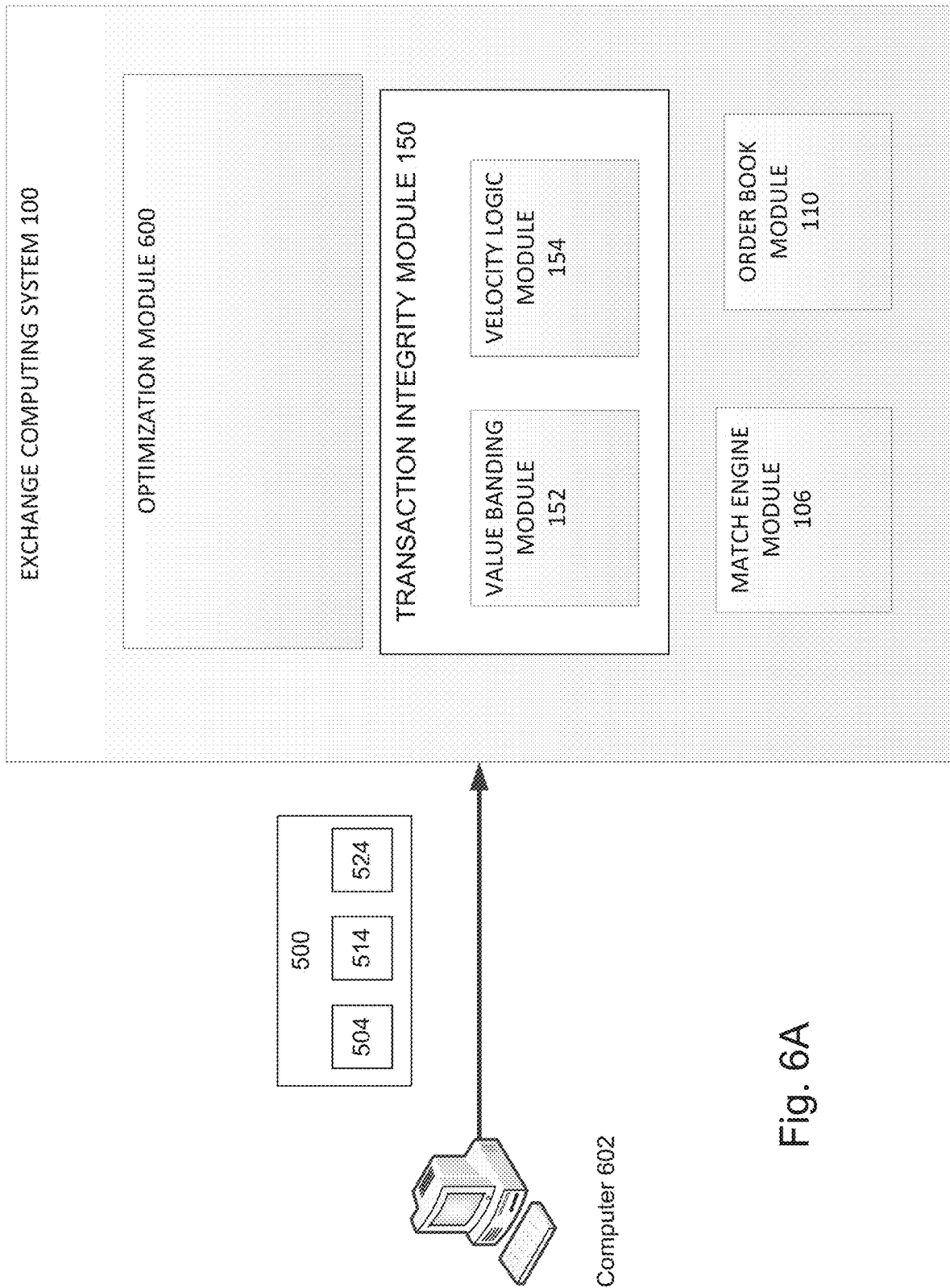
FIGS. 6A to 6F depict block diagrams of an exemplary implementation of an optimization module, according to some embodiments.

The disclosed optimization system may be implemented, in one embodiment, as an optimization module 600 as shown in FIG. 6A. FIG. 6A illustrates an example computing system 100 which includes optimization module 600, transaction integrity module 150, match engine module 106, and order book module 110. Optimization module 600 may include an optimization processor. Exchange computing system 100 may be similar to, or the same as, exchange computing system 100 described in connection with FIG. 1. Transaction integrity module 150 includes a value banding module 152 and a velocity logic module 154, each of which protects the integrity of the exchange computing system 100 by performing a corrective action (e.g., rejecting the transaction request, or halting a matching processor) if undesirable conditions are detected. Match engine module 106 and order book module 110 are utilized to attempt to match an incoming transaction request, and place any unsatisfied transaction request quantity on the order book object for the associated financial instrument.

As shown in FIG. 6A, client computer 602 transmits electronic data multiple transaction request message 500 to exchange computing system 100. Electronic data multiple transaction request message 500 includes electronic data transaction requests 504, 514 and 524.

Electronic data transaction requests 504, 514 and 524 may be requests associated with the same transaction type, e.g., acquire or relinquish, for the same financial instrument. Electronic data multiple transaction request message 500 and its contents are generated by a user associated with client computer 602. Electronic data transaction requests 504, 514 and 524 may be positioned and arranged within the electronic data multiple transaction request message 500 in a sequence such that the electronic data transaction request with the best value, as discussed herein, is located in a position known to the exchange computing system/optimization module 600 to be the position for the best value. Thus, the optimization module can identify the transaction request with the best value for any given transaction type in one electronic data multiple transaction request message.

Figure 6B:
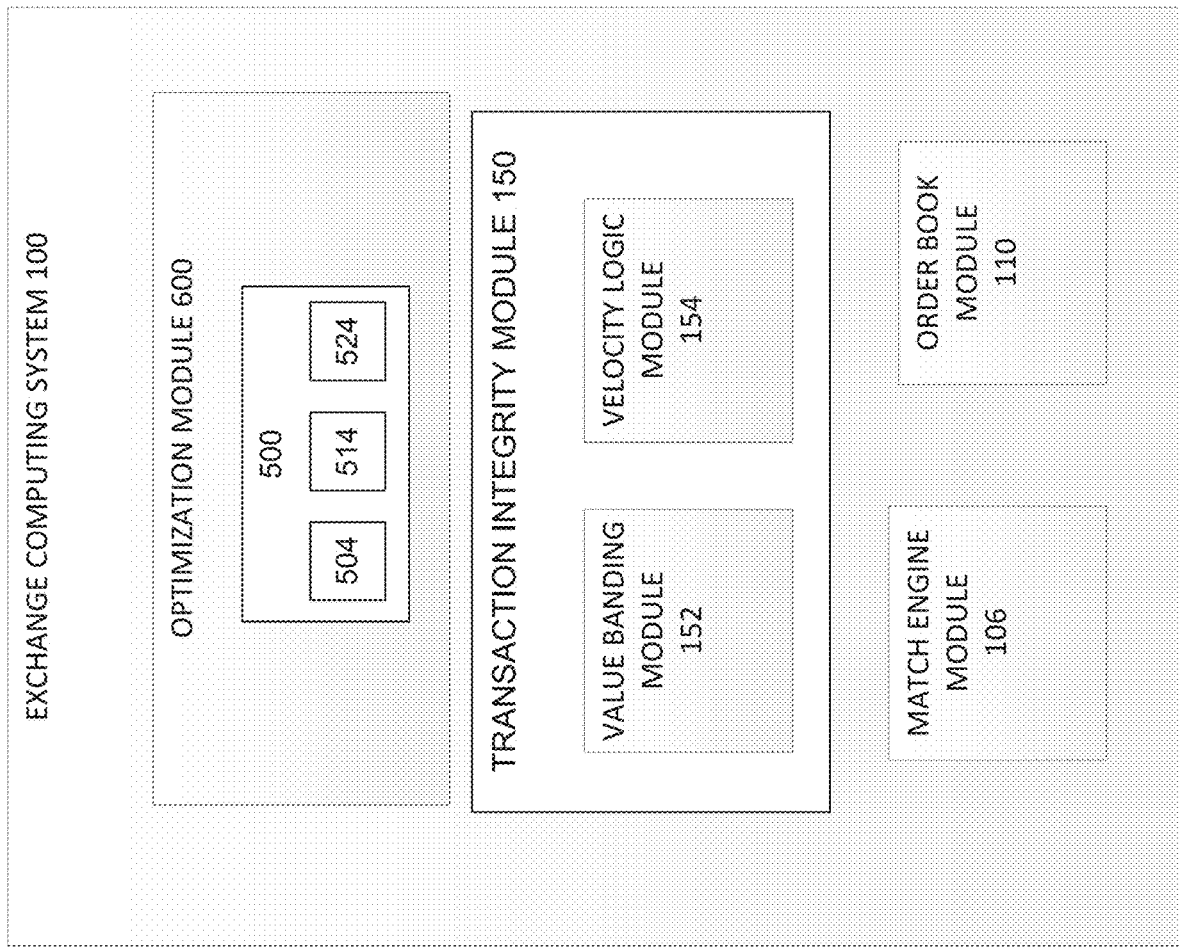
Figure 6B:
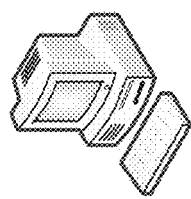

As shown in FIG. 6B, optimization module 600 receives electronic data multiple transaction request electronic data multiple transaction request message 500. In one embodiment, optimization module 600 may check whether the electronic data transaction requests within electronic data multiple transaction request message 500 are sorted from best to worst value, as described above. In one embodiment, optimization module 600 identifies a first position within electronic data multiple transaction request message 500 which indicates that the value in the first position should be understood by the optimization module to be the best value.

Figure 6C:
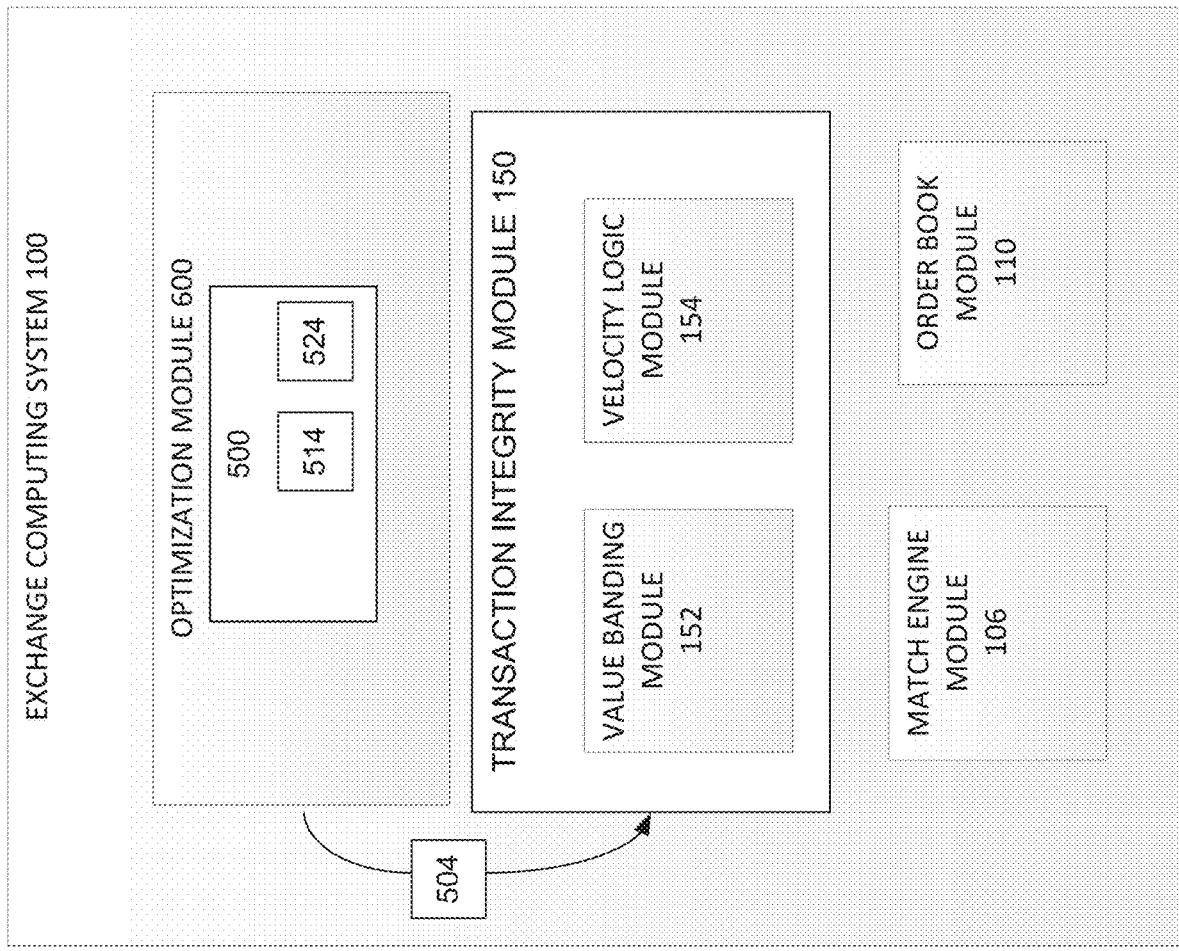
Figure 6C:
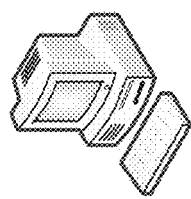

As shown in FIG. 6C, the optimization module 600 may be in communication with transaction integrity module 150. The optimization module 600 may transmit the best value, the value associated with electronic data transaction request 504 in example FIG. 6C, to the transaction integrity module 150.

Figure 6D:
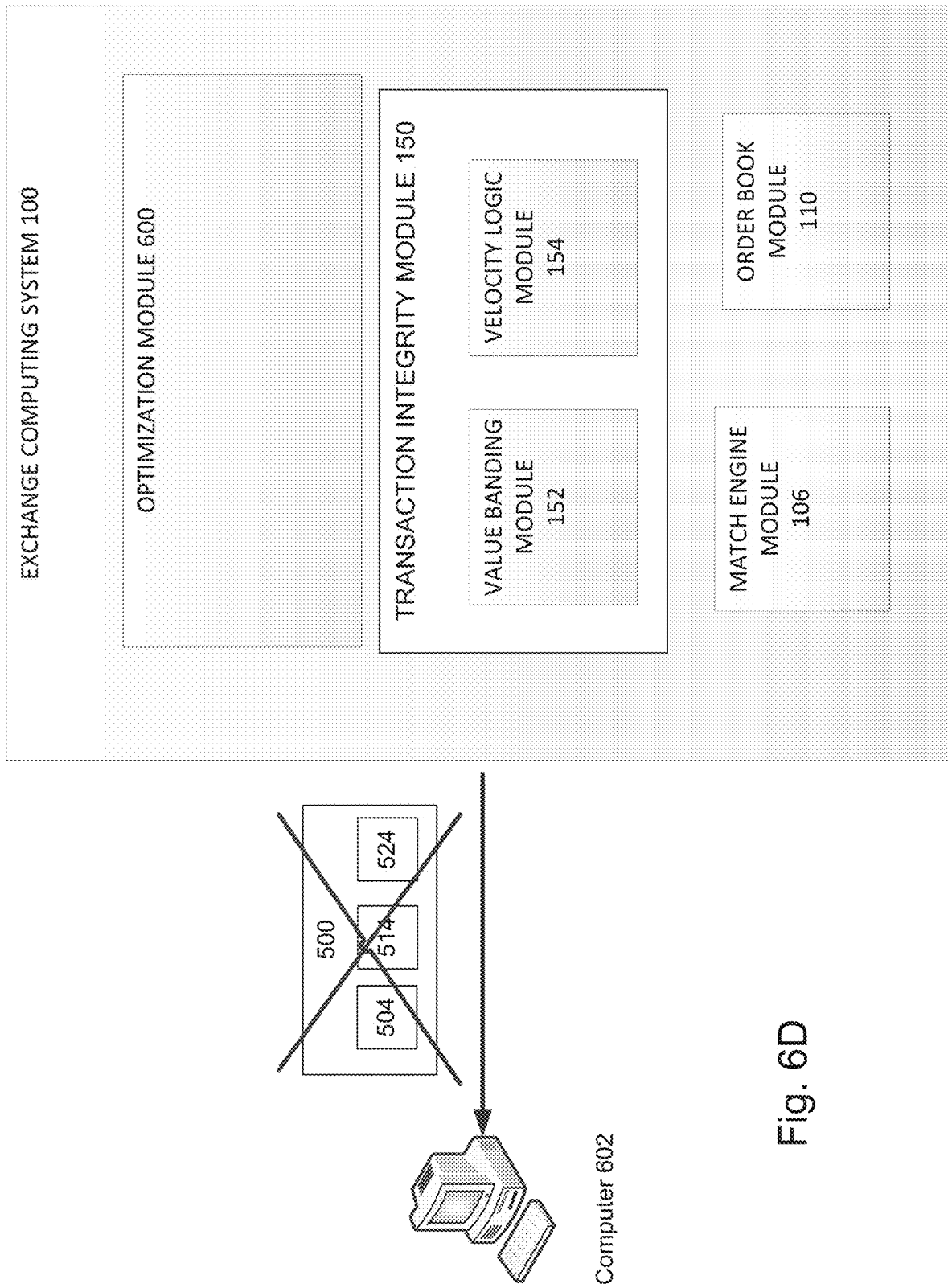

If the transaction integrity module 150 determines that electronic data transaction request 504 does not pass the integrity logic processing of transaction integrity module 150, i.e., would be rejected by the transaction integrity modules, optimization module 600 may reject the entirety of electronic data multiple transaction request message 500, and additionally transmit a notification to client computer 602 that electronic data multiple transaction request message 500 has been rejected for transaction integrity module failure, as shown in FIG. 6D. It should be appreciated that due to the implementation of optimization module 600, the exchange computing system 100 is able to reject all of the electronic data transaction requests in electronic data multiple transaction request message 500 by only transmitting and checking electronic data transaction request 504 via the transaction integrity module 150. Said another way, optimization module 600 is able to conclude that electronic data transaction requests 514 and 524 will not pass the transaction integrity module 150's logic without actually having to transmit electronic data transaction requests 514 and 524 to the transaction integrity module 150. The transaction integrity module 150 accordingly only needs to process (e.g., check) electronic data transaction request 504, eliminating the consumption of computing resources and time/processing delay that would otherwise be necessary to additionally process electronic data transaction requests 514 and 524.

If electronic data transaction request 504 passes transaction integrity module 150's integrity logic processing, then the optimization module 600 may route some or all of the other transaction requests for the same transaction type, e.g., transaction request 514 and 524, through the transaction integrity modules. If any of the subsequent transaction requests fails the transaction integrity module's integrity logic processing, the optimization module may be able to reject all other transaction requests of the same transaction type that are worse than the failed subsequent transaction request. Thus, for example, if electronic data transaction request 504 passes transaction integrity module 150's integrity logic processing, then transaction request 514 is routed to transaction integrity modules 150. If transaction request 514 fails the transaction integrity module 150's integrity logic processing, then the optimization module rejects both transaction request 514 and 516. Accordingly, in this example, the optimization module is able to reject transaction request 516 without needing transaction integrity modules to actually test or check transaction request 516, reducing the amount of processing performed by the exchange computing system 100.

Figure 6E:
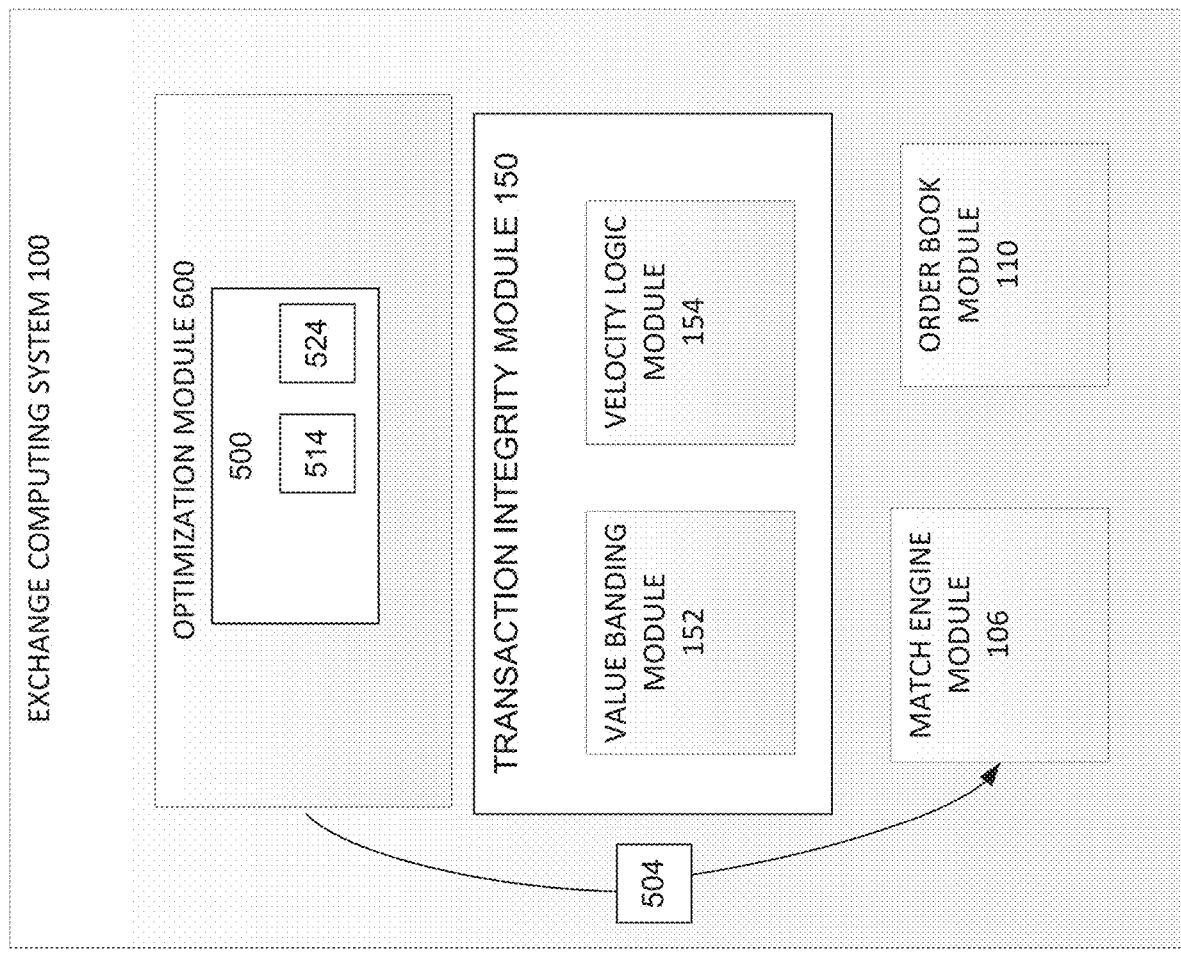
Figure 6E:
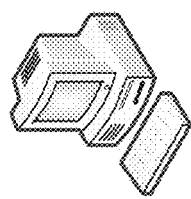

Referring now to FIG. 6E, the optimization module may transmit the best value, electronic data transaction request 504, to the match engine module 106. Match engine module 106, or the optimization module 600 in communication with match engine module 106, may determine whether electronic data transaction request 504 will match with a resting order, e.g., previously received but unsatisfied transaction request that is counter to the transaction type of transaction request 504.

Figure 6F:
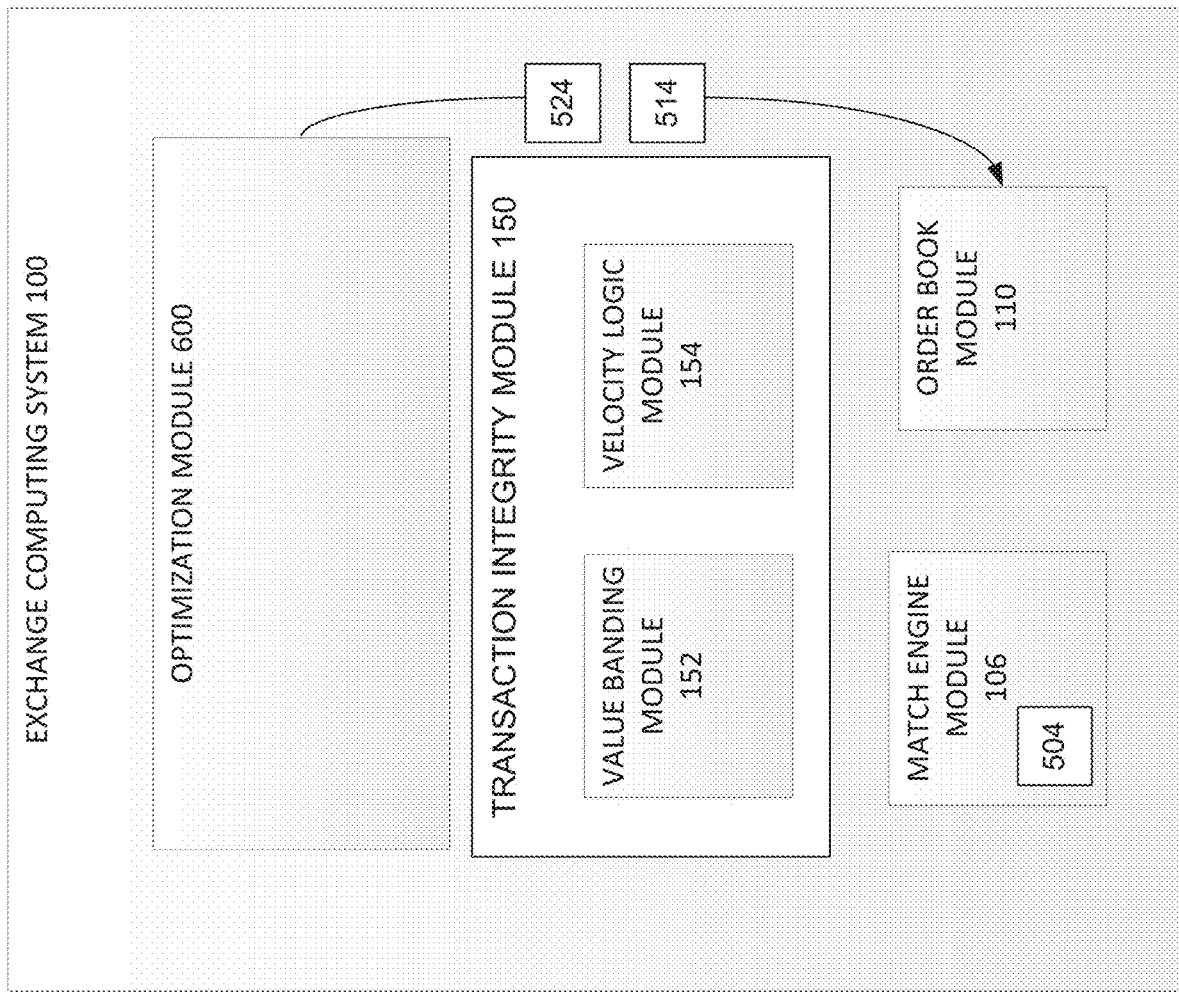
Figure 6F:
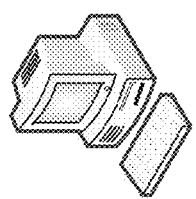

If the optimization module 600, in communication with match engine module 106, determines that transaction request 504 will not match any of the currently resting orders in the order book object associated with the financial instrument associated with transaction requests 504, 514 and 524, optimization module 600 transmits transaction requests 514 and 524 directly to the order book module 110, as shown in FIG. 6F. It should accordingly be appreciated that due to the implementation of optimization module 600 in example FIGS. 6E and 6F, the match engine module 106 avoids the need to process or attempt to match transaction requests 514 and 524.

If the optimization module 600, in communication with match engine module 106 and order book module 110, determines that transaction request 504 will match a currently resting order in the order book object associated with the financial instrument associated with transaction requests 504, 514 and 524, optimization module 600 may route some or all of the other transaction requests for the same transaction type, e.g., transaction request 514 and 524, through the match engine module 106. If any of the subsequent transaction requests does not match (e.g., based on the match engine module logic), the optimization module may be able to directly transmit all other transaction requests of the same transaction type that are worse than the un-matched subsequent transaction request directly to the order book module 110 so that the transaction requests may be added as resting orders to the order book object. Thus, for example, if electronic data transaction request 504 matches a currently resting order, then transaction request 514 is routed to the match engine module 106. If transaction request 514 does not match based on the match engine module 106's logic, then optimization module routes transaction request 516 directly to the order book module 110. Accordingly, in this example, the optimization module is able to route transaction request 516 to order book module 110 without needing match engine module 106 to attempt to match transaction request 516, reducing the amount of processing performed by the exchange computing system 100.

Figure 7:
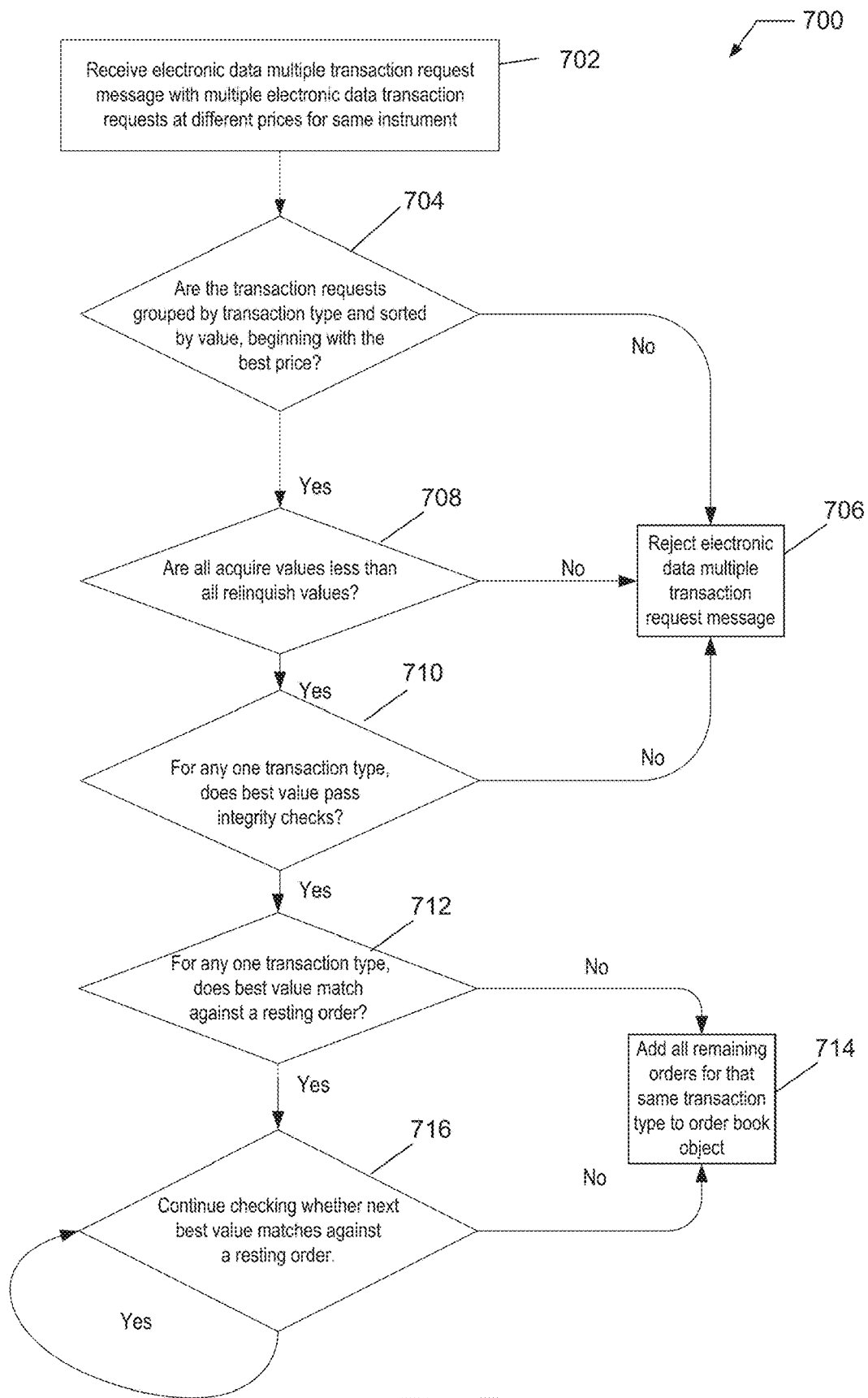
FIG. 7 depicts a high-level flowchart illustrating a method for processing electronic data multiple transaction request messages by a data transaction processing system, according to some embodiments.

FIG. 7 illustrates an example computer implemented method 700 which may be implemented in an exchange computing system that includes the optimization processor described herein. Embodiments may involve all, more or fewer actions indicated by the actions of FIG. 7. The actions may be performed in the order or sequence shown or in a different sequence.

In step 702, an optimization processor (which may be, or be located in, the optimization module 600 discussed above) in the exchange computing system may receive an electronic data multiple transaction request message, which includes multiple orders (e.g., electronic data transaction requests) at different prices or values for a same financial instrument. The optimization processor then determines whether the instructions or transaction requests in the electronic data multiple transaction request message are grouped by side, for example, by transaction type, and sorted beginning with the best value or price, as shown in step 704. The optimization processor rejects the electronic data multiple transaction request message if the electronic data transaction requests are not grouped by transaction type and are not sorted beginning with the best price, as shown in step 706.

In step 708, the optimization processor determines whether all of the buy prices are less than all of the ask prices and, if not, rejects the electronic data multiple transaction request message as shown in step 706. The check in step 708 may be performed to ensure that electronic data transaction requests within the electronic data multiple transaction request message do not self-match, e.g., electronic data transaction requests to acquire a data object do not match with electronic data transaction requests in the same electronic data multiple transaction request message to relinquish the data object (e.g., submitted by the same client computer, because they are in the same electronic data multiple transaction request message).

In one embodiment, the optimization processor may determine whether all of the values associated with acquire electronic data transaction requests are less than all of the values associated with relinquish electronic data transaction requests, and whether the electronic data transaction request associated with the best value for acquiring the data object is greater than a lead acquisition value stored in an order book object for the data object. Upon determining that all of the values associated with acquire electronic data transaction requests are less than all of the values associated with relinquish electronic data transaction requests, and that the electronic data transaction request associated with the best value for acquiring the data object is greater than a lead acquisition value stored in an order book object for the data object, the optimization processor may store data associated with the relinquish electronic data transaction requests in the order book object associated with the data object. Thus, the optimization processor may determine whether the highest bid is now at or above the previous best bid on the book, and if so, the optimization processor can forward all of the sell orders in the electronic data multiple transaction request message without having to check whether the sell orders match against any of the resting bid orders, thus minimizing the amount of processing performed, or needing to be performed, by the match engine module.

In step 710, the optimization processor determines if the best price for each transaction type passes the integrity checks performed by the transaction integrity module and, if not, the optimization processor rejects the electronic data multiple transaction request message, again leading to step 706.

The optimization processor may also determine whether the best price matches against a resting order and, if not, the optimization processor bypasses match attempts for all other values in the electronic data multiple transaction request message, and adds all of the other orders to the order book for that financial instrument, as shown in step 714. If the best price matches against a previously resting order, the optimization processor, in connection with the match engine module and the order book module, continues checking whether the next best price matches against a resting order. Upon encountering or processing a value in the sorted sequence that does not match against a resting order, the optimization processor adds all such remaining orders to the order book, thus bypassing having to process all remaining orders for that same side through the match engine module.

Figure 8:
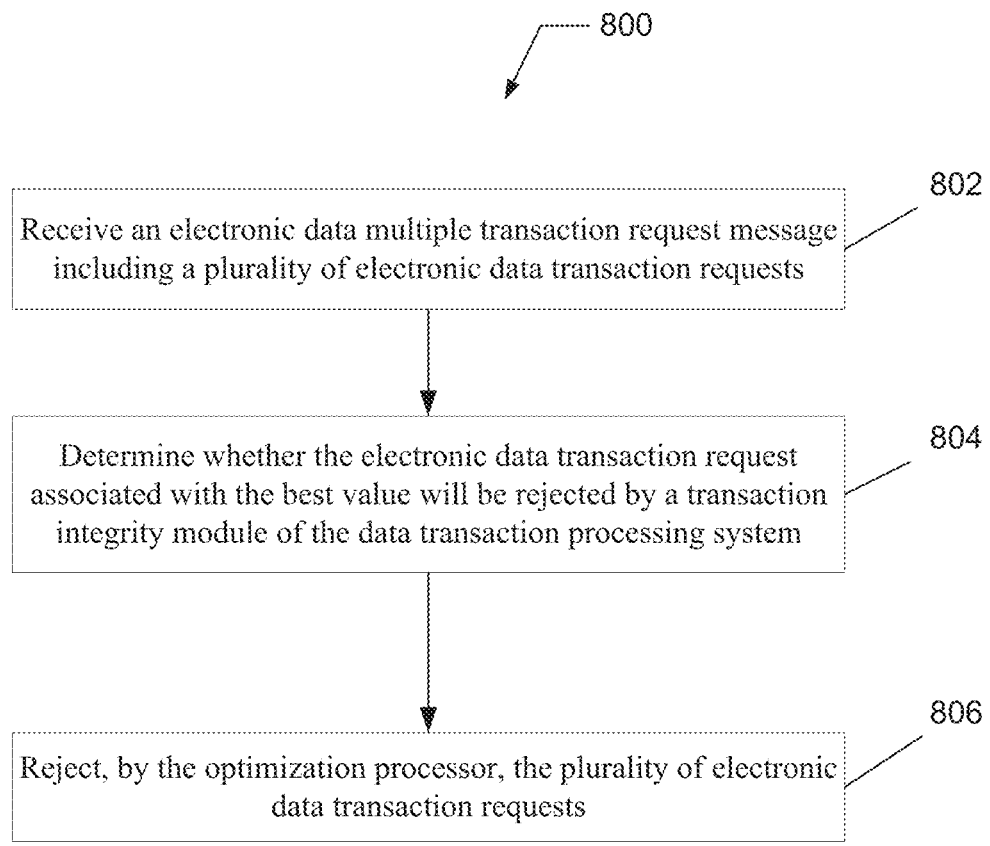
FIG. 8 depicts another high-level flowchart illustrating a method for processing electronic data multiple transaction request messages by a data transaction processing system, according to some embodiments.

FIG. 8 illustrates an example computer implemented method 800 for optimizing processing of electronic data multiple transaction request messages. Embodiments may involve all, more or fewer actions indicated by the actions of FIG. 8. The actions may be performed in the order or sequence shown or in a different sequence.

In one embodiment, method 800 may be implemented in a data transaction processing system in which data objects are transacted by a hardware matching processor that matches electronic data transaction requests for the same one of the data objects based on multiple transaction parameters received from different client computers over a data communication network.

At step 802, method 800 includes receiving an electronic data multiple transaction request message including a plurality of electronic data transaction requests. Each of the electronic data transaction requests may request performance of a same type of transaction for a quantity of the same data object at a value. The electronic data transaction requests may be sorted, within the electronic data multiple transaction request message, by value for each transaction type, from the electronic data transaction request associated with the best value to the electronic data transaction request associated with the worst value.

At step 804, method 800 includes determining whether the electronic data transaction request associated with the best value will be rejected by a transaction integrity module of the data transaction processing system.

At step 806, method 800 includes, upon determining that the electronic data transaction request associated with the best value will be rejected by the transaction integrity module, rejecting the plurality of electronic data transaction requests.

Atomic Dual-Pass Processing

In one embodiment, the electronic data multiple transaction request message may include an atomic instruction indicating that the multiple electronic data transaction requests should only be processed if all of the multiple electronic data transaction requests can match against previously received but resting electronic data transaction requests. In other words, if any of the multiple electronic data transaction requests cannot be matched based on the current state of the order book objects associated with the financial instruments listed in the electronic data multiple transaction request message, the optimization processor/exchange computing system does not process or attempt to match any of the multiple electronic data transaction requests.

In one embodiment, the optimization processor may associate a flag with each transaction request, and upon evaluating an electronic data transaction request, set the flag to indicate whether the transaction request, if processed, will result in a match. The optimization processor traverses through all of the multiple electronic data transaction requests, e.g., in a first pass, setting the flag to Yes or No, or alternatively, On or Off, for each transaction request, depending upon whether the transaction request will be matched. The optimization processor then determines whether all of the flags associated with the multiple electronic data transaction requests in an electronic data multiple transaction request message are set to be Yes, or On, indicating that each electronic data transaction request will be matched. The optimization processor then processes/actually matches, e.g., in a second pass through the transaction requests, each of the electronic data transaction requests in sequence. The disclosed embodiments accordingly enable a user to submit messages that are processed either as an atomic group, or not at all.

As discussed herein, an order to trade, or trade order, is effectively an order or request for a transaction with respect to a financial instrument, such as a futures contract, options on future, spread or other combination contract, etc., wherein the transaction further specifies at least whether the trader desires to buy (bid) or sell (offer) the financial instrument, the desired price therefore, and quantity thereof. It should be appreciated that other factors, such as conditions, e.g. stop orders, etc., may also be specified. Further the price may be specified as a fixed value, relative value, upper or lower limit value, or range of values. The financial instrument may comprise one or more component instruments or component transactions. A financial instrument comprising more than one component instrument may also be referred to as a combination contract or combination financial instrument. A combination contract, also referred to as a strategy, may be defined as a combination of orders for outright contracts where each order for an outright contract forms a "leg" of the strategy, also referred to as a leg order. The definition of the combination contract further specifies whether buying a unit quantity of the strategy, i.e. the combination contract, requires a given leg to be bought or sold and in what quantity. Strategies may be defined by the exchange and advertised to traders as tradable instruments and/or they may be defined upon request by a market participant, such as via a request submitted to the exchange computing system. As described above, a combination contract permits the simultaneous trading of the component instruments thereof, i.e. simultaneous submission on the orders therefore, into a market for that instrument. Combination contracts may be used to hedge risk, e.g. risk that a price of the underlier will rise or fall in the future, risk that prices will be volatile, risk of a rise or fall in interest rates, or other risk. It will be appreciated that market participants may attempt to simulate combination contracts, particularly those not defined by the exchange computing system and therefore were no specific market for the combination contract exists, by separately submitting the component transactions as separate orders into the associated markets but may incur additional transaction fees and the risk, referred to as "leg risk," that the individual orders may be not be processed as desired, such as due to a change in the market at the time of submission or proximate thereto.

An order for a financial instrument comprising more than one component instrument, i.e. a combination financial instrument or contract, enables a trader to transact in multiple instruments with a single transaction which, for example, reduces transaction fees and/or the delay between submission of orders for the involved financial instruments (which may be advantageous when prices for those instruments are quickly changing), thereby reducing leg risk. In one embodiment, the dual-pass processing by an optimization processor may be implemented to reduce or eliminate leg risk. In particular, the client computer may use the disclosed electronic data multiple transaction request message to specify electronic data transaction requests that are either all executed immediately (e.g., during the second pass of the dual-pass optimization process) or not executed at all, and deleted immediately without being stored in the respective order book objects.

The atomic dual-pass optimization described herein may also allow a first user to submit multiple transactions that are processed atomically, e.g., without the risk of intervening transactions from other users being executed between the first user's multiple electronic data transaction requests.

The atomic dual-pass functionality of the optimization processor enables the exchange computing system to guarantee that the multiple instructions linked by the mass order identifier are executed as a unit, e.g., atomically. In one embodiment, an electronic data multiple transaction request message including the atomic dual-pass instruction is only executed (e.g., matched) if all instructions within the order can be executed immediately. Otherwise, the electronic data multiple transaction request message and its multiple electronic data transaction requests are cancelled.

In one embodiment, an electronic data multiple transaction request message may allow the exchange computing system to receive a set of related transaction requests (for different data objects) from a first sender of the plurality of senders and test the set to determine if all the transaction requests can be executed based on the current state of the order book objects associated with the different data objects. If all the transaction requests cannot be executed, all the transaction requests are rejected. If all the transaction requests can be executed, all the transaction requests are executed before executing any other transaction request for any of the data objects received subsequent to the set of related transaction requests and before communicating a result of the execution of any of the set of related transaction requests. In one embodiment, executing the set of related transaction requests may comprise optimizing the executing as discussed herein, e.g., via an optimization processor.

Transaction Integrity Modules

Transaction integrity modules may be implemented to automatically perform a corrective action, e.g., halt or release the matching processor depending on the state of the system and/or the contents of the electronic data transaction request messages. For example, upon detecting an undesirable condition within the data transaction processing system, transaction integrity modules may cause halting of the matching processor, which prevents the matching processor from matching messages, e.g., places the system or data objects related to the undesirable condition in a reserved state. After the passage of time, receipt of a number of messages, or some other predetermined condition, transaction integrity modules may release the matching processor, or allow the matching processor to resume matching messages.

Transaction integrity modules may also check certain messages or orders for products traded via the exchange computing system. Transaction integrity modules may also check certain messages or orders for order books maintained on the exchange computing system. The products or order books may be represented as data objects within the exchange computing system. The checked messages may be recently received messages (e.g., a limit price on a new incoming order, or a modification of a previous order), or recently triggered messages (e.g., a limit price in a stop order resting on the books that is triggered by a trade at the stop price).

Transaction integrity module processing is time consuming and increases latency, in part because it compares each transaction request value to predetermined and/or dynamic thresholds. Applicants have determined that if the best transaction request value from a plurality of electronic data transaction requests for the same transaction type of the same financial instrument fails the integrity logic testing of the transaction integrity module, then all of the other transaction requests in the same electronic data multiple transaction request message for the same transaction type would also fail the integrity logic testing of the transaction integrity module. Thus, the optimization processor only needs to test the best value in a group of transaction requests for the same side (e.g., transaction type) of a financial instrument in cases where the best value fails the integrity logic testing, and in such cases, can reject all of the other transaction requests for the same transaction type without having to test all of the other transaction request values.

Referring back to FIGS. 6A through 6F, if the optimization module determines that a transaction request should be routed to the transaction integrity module 150, the transaction request may be subject to the processing of a value banding module 152 and/or a velocity logic module 154.

The value banding module 152, in one embodiment, prevents erroneous order entry prices. For each product, a range, or "band", of valid values is configured. If an order is entered for a product with a price falling outside of the price band, the value banding module 152 will reject the transaction request, so that the transaction request is not matched or added to the order book. In other words, a transaction request is not further processed or analyzed if the value banding module 152 rejects the transaction request. Thus, in one embodiment, the value banding module 152 may be useful to prevent antagonistic or erroneous orders, such as limit bids at values well above the market or limit offers.

In one embodiment, the value banding module 152 rejects any buy transactions above a "reference last value" plus a fixed band value, and rejects any sell transactions below a "reference last value" minus a fixed band value. The reference last value may be determined by the most recent transaction, or the best bid or best offer through the most recent transaction. The reference last value may also be determined by a settlement value, or an exchange determined value, only if no values are available from the most recent transaction or the best bid or best offer through the most recent transaction.

Thus, the value banding module 152 may reject electronic data transaction requests having values outside of a banding threshold defining an allowable value range.

If a transaction request is not rejected by the value banding module 152, the transaction request is routed towards a velocity logic module 154, which implements velocity logic processing.

The values to which velocity logic processing is applied (whether they be the current sampled, derived or measured parameters or value at which different quantities will actually trade, depending on whether the order matches at all, and if so, whether it matches partially or fully) are compared with one or more sampled, derived, measured or computed values, or ranges thereof, representative of each interval or slice of time preceding the current sample, the collection of which may be referred to as a window as well as, in one embodiment, with some or all of the previous values sampled, derived or measured within the current interval.

FIGS. 9A and 9B illustrate various diagrams depicting how samples may be obtained and compared for transaction integrity processing. Transaction integrity modules sample or otherwise derive a market value parameter ($P_n$), which may be a high ($V_{hi}$) and/or low ($V_{lo}$) value thereof, during time intervals or slices in that elapse upon a duration of time. For example, FIG. 9A illustrates time intervals in associated with parameters $P_n$ which are representative of the value of a data object over the duration of the interval, e.g. the highest and/or lowest value over the interval.

During each interval or time slice, the sampled market parameter value, e.g., of each incoming trade or triggered limit value from a conditional order, is compared with one or more parameters indicative of the market value determined during each of a defined number of preceding intervals described above. In one embodiment, the sampled market parameter value, e.g., of each incoming trade or triggered limit value from a conditional order, is alternatively or additionally compared with one or more parameters sampled, derived or measured during the current interval.

It should be appreciated that sampled market parameter values of triggered limit values from conditional orders determined during a given interval refers to limit values that are triggered during the given interval.

In one embodiment, the sampled or derived parameter obtained during the current interval may be compared with comparative parameters/values, such as the values of the previously acquired samples of the preceding intervals, as well as the preceding values acquired during the current interval. In an alternative embodiment, at each interval other comparative parameters are determined, such as the highest and lowest value of the monitored parameter over the duration of particular interval, to which the sampled parameter obtained during the current interval is compared.

For the current interval, such highest and lowest values are determined as each market parameter is sampled, measured or derived, for comparison with the most current (e.g., incoming during the current interval or limit value from a conditional order triggered during the current interval) market parameter value.

Initially, when a trading period commences or otherwise there is no market history, e.g. the market opens, or otherwise when operation of transaction integrity modules is initiated (or after a sufficient period of market inactivity as will be discussed below), the first sample of the market value parameter ($P_1$) may be defined, such as statically, or otherwise derived, such as based on the parameter value at the close of the prior trading period, the first value sampled, derived or measured upon commencement of the trading period, or based on some other method such as derivation of an indicative opening price.

The number of preceding intervals/slices which are subject to comparison is configurable and effectively defines a rolling window of time where older intervals are discarded as time moves forward, e.g. new intervals commence. In one implementation, this rolling time window may be structured or otherwise conceptualized as multiple overlapping sampling/monitoring windows or threads, referred to as overlapping time buckets (be) illustrated in FIG. 9B, which run for a defined period of time and where a new time bucket is commenced, the market value parameter is sampled or otherwise determined or derived, upon each elapse of the interval time i, and time buckets commenced at a time older than the defined number of preceding intervals are discarded. The number of active time buckets, the duration thereof, and the interval at which buckets are started then defines the window of time over which, or otherwise how far back, transaction integrity modules operate. In one embodiment, if there has been no market activity during any of the intervals within the time window, the disclosed system considers the next market event to be akin to the start of a new trading period as described above.

It will be appreciated that whether transaction integrity modules are conceptualized as overlapping time buckets or as a duration of time defined by intervals or slices, as described, or in any other manner, may be implementation dependent and all such conceptualizations, now or later developed, are contemplated herein.

In one embodiment, the time window over which an incoming order is compared may be defined order by order, e.g. based on the incoming order. That is, each incoming order has its own time window wherein the incoming order is compared with values within its associated time window. For example, each incoming order may be compared with orders received in the window and preceding the current order. As described elsewhere, the window may be specified as an amount of time or a number of intervals.

Each sampled, derived or measured value obtained during the current time interval or slice is compared with one or more comparative values determined for preceding time intervals/slices, referred to as the time window, as well as, in one embodiment, each preceding sampled, derived or measured value, or the highest and or lowest thereof, during the current interval.

If the sampled value deviates, i.e. is above or below, from any of the comparative values by a threshold amount, which may be configurable and may be zero, transaction integrity modules may indicate a qualifying event and indicate that action should be taken. In one implementation, the threshold amount is not less than one. The threshold amount may be statically or dynamically configured and reflects the magnitude of market movement between compared values that may be tolerated, i.e. the threshold amount delineates magnitude of movement/change, up or down, considered to be normal for the market and avoids, for example, placing a market in a reserved state that is not, in fact, under duress.

The threshold amount may be based on the product being traded or associated order book and may be, for example, a number determined by the GCC. For example, the threshold amount may be a multiple of a non-reviewable range ("NRR") that is pre-determined by, e.g., an administrator of the exchange computing system. A NRR may define a range that is considered a reasonable trading deviation from a product's fair or active (e.g., currently observed) value. In one embodiment, the NRR may be a range that an administrator or administrators of the exchange computing system consider to be a reasonable amount for a product to trade away from the product's fair value. In one embodiment, the NRR may be reviewed and established on a periodic basis, e.g., quarterly. The exchange administrators may consider a variety of metrics, such as volatility, average daily ranges, margin, and tick value, for example, to determine the NRR.

Figure 10:
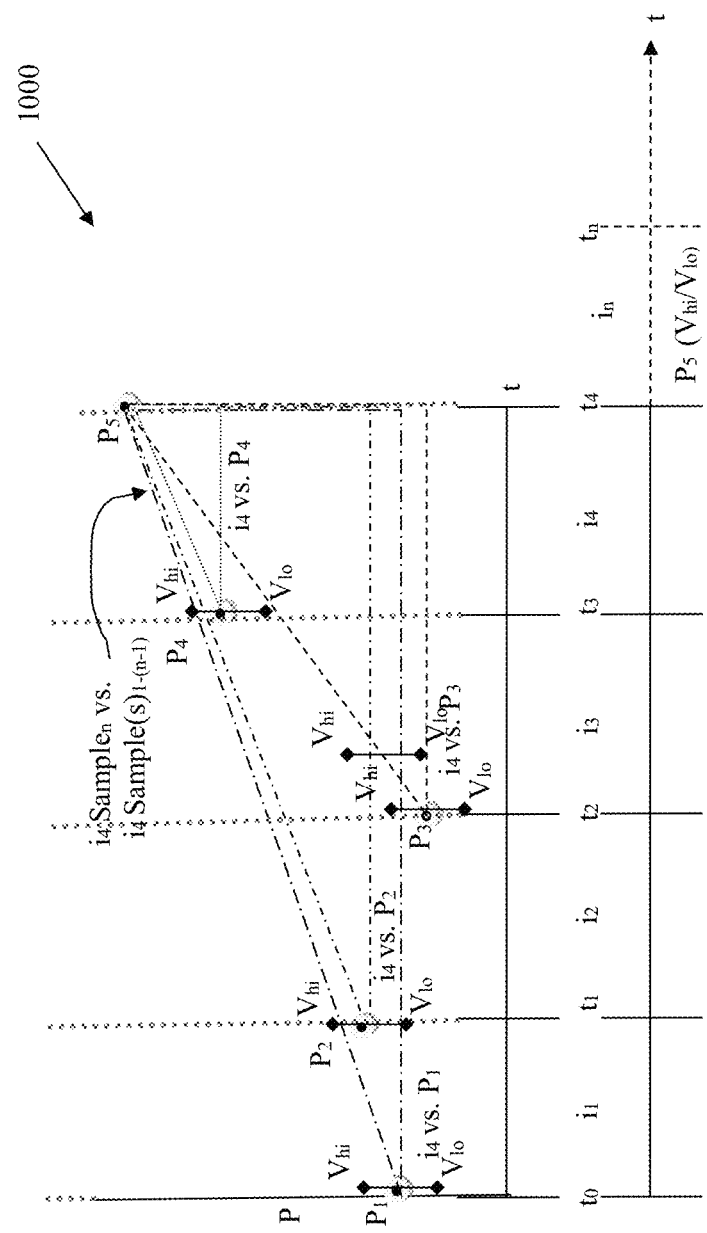
FIG. 10 depicts an illustrative graph of an example transaction integrity module.

FIG. 10 illustrates an example comparison plot 1000 of parameters that are sampled according to an example transaction integrity module, namely, a velocity detection and mitigation system. In FIG. 10, sampled parameters obtained during the interval $i_4$, namely, $P_5$, are compared with each of the preceding values sampled in interval $i_4$ as well as the values $P_4$, $P_3$, $P_2$ and $P_1$, or the high ($V_{hi}$) or low ($V_{lo}$) values thereof, of the preceding intervals. Plot 1000 may effectively be used to measure the steepness and direction of the slope between the market value at the current interval and each of the preceding intervals where a qualifying event may be determined when the steepness of the slope, or angle or other value representative thereof, whether positive or negative, exceeds, or otherwise deviates from, a defined threshold value indicative, for example, of an extreme market movement. The slope may be may be positive as illustrated in FIG. 10, or negative, between intervals.

In one embodiment, rapid oscillation or thrashing of the market value within the threshold values may also be detected and may also signify that the market is not operating properly, triggering the remedies described herein.

In one embodiment, the interval width, referred to below also as the duration of time or time slice length, may be dynamic and may vary interval to interval such as based on market activity, e.g. volume or volatility. For example, an interval may be defined as every 10 milliseconds, or after 10 orders have been received. As the comparative values computed at each interval are representative of the activity during that interval, the amount of activity aggregated together in one interval may thereby be normalized. In the case of dynamic interval widths, the time window over which values are compared, as described herein, may be specified in terms of an amount of time, rather than a number of intervals, so that the window may be a constant size even though the interval size may vary.

Referring back to FIGS. 6A to 6F, integrity logic may be performed by the transaction integrity module that determines whether an electronic data transaction request message will cause or be involved in a match, and if so, whether some but not all (e.g., a partial match), or all (e.g., a full match) of the quantity associated with the electronic data transaction request message is matched. A transaction integrity module may also assign message values or match values as comparison values. In other words, a transaction integrity module may determine how much, if any, quantity of an electronic data transaction request message will match and at what value, and then assign the message value and/or any match values as comparison values to be checked, depending on whether a match is detected at all, and if so, how much quantity associated with the electronic data transaction request message will match.

Transaction integrity modules may identify at least one comparative value of the product, which may be stored, such as in a memory, e.g., memory 204, for example in association with the data representative of a time window, for later comparison with future identified comparison values upon each elapse of the duration of time, e.g. each interval in as shown in FIGS. 9A and 9B, and determining each previously identified comparative value identified within a threshold time thereof. As described above, during each the elapse of the time, each comparison value may further be compared with comparative values comprising the preceding comparison values, or a derivation thereof, determined during the elapse of time. As described herein, the comparative value may be derived from the same or a different parameter from the comparison value and more than one comparative value may be determined, such as a minimum and maximum thereof. Upon initiation of monitoring, such as when the market opens or re-opens or trading otherwise commences or after a sufficient period of inactivity (such as within the threshold time), the initial comparison and comparative values may be initialized to configured values or otherwise defined according to rules such as being based on the state of the market at the close of the prior trading period, e.g. based on an indicative opening price.

In one embodiment, a comparative value may be updated or revised based on previous object values. When applied to an electronic trading system, a comparative value may be a pre-defined threshold that is updated upon each elapse of duration of time based on a product's values during one or more previous elapses of durations of time.

In one embodiment for use in markets for which outright orders (orders actually placed by a trader) as well as implied orders (orders generated by the Exchange based on outright orders placed in other markets, e.g. spread orders), may be received, only aggressor orders, i.e. outright orders, may be included in the derivation of the comparative values and further utilized as comparison values. In this embodiment, received implied orders may be ignored by the exchange computing system.

In one embodiment, the value of the product comprises, for example, a bid price of the product, an ask price of the product, a last traded price of the product, a last traded quantity of the product, a volatility of the product, or other market attribute value, or combination thereof. It will be appreciated that the value of the product may be determined according to other metrics of product value.

In one embodiment, a transaction integrity module determines the comparison value of the product as a value of each order to trade the product received during the elapse of the duration of time, e.g. the bid price, the ask price or trade price. In one embodiment, the comparative value is derived from the same parameter as the comparison value. It will be appreciated that fewer than all orders to trade may be compared, and that this sampling frequency may be configurable.

Alternatively, the transaction integrity module may determine the at least one comparative value of the product as a minimum value of the product over the duration of time, e.g. the interval in which just elapsed, maximum value of the product over the duration of time, an average of the value of the product over the duration of time, or combinations thereof. In one embodiment, the comparative value(s) may be computed as a weighted average wherein more recent values are favored over older vales.

The threshold time, which in one implementation may be the Time Slice Count, defines how far back the transaction integrity module will look, referred to above as a "window" or number of active slices or intervals, i.e. how many intervals will be compared, and may be specified in seconds, milliseconds and/or as a multiple of the duration of time, i.e. interval in, e.g. Time Slice Count. It will be appreciated that different threshold times, e.g. asymmetric time windows, may be specified for positive market changes and negative market changes, such as where the rate of negative movement, e.g. a dip, is determined to be more critical than the rate of positive market movement, e.g. a spike. It will be appreciated that the threshold time may be set so as not to be less than a minimum amount of time required for a market participant to react to a change in the market, e.g. receive and assimilate market data indicative of the change and submit an order responsive thereto. In other words, the threshold time should be set so as to allow the market participants a chance to respond and correct an extreme market change before the system transaction integrity module reacts thereto as described.

The transaction integrity module may determine a difference between the identified comparison value, e.g. sample, and each of the determined previously identified comparative values. The current sample/comparison value is compared only with previously identified comparative values that are within the defined time window, i.e. within the threshold time of the current time.

The transaction integrity module may determine if any of the determined differences deviate, either higher or lower, from a threshold value. As described above the threshold value defines the magnitude of movement, either up (positive) or down (negative), which would be tolerated, e.g. considered normal market behavior. The threshold value may be specified in terms compatible with the values being monitored and compared, such as price ticks, points or other metric. For example, the threshold value may be 10 ticks. If the comparison value differs from an of the relevant prior comparative values but more than 10 ticks, either more than 10 ticks above or more than 10 ticks below, a deviation is determined. It will be appreciated that the threshold values may be asymmetric, i.e. a threshold value may be specified for positive market changes and a different threshold value may be specified for negative market changes, such as where market dips are considered more critical than market spikes. In one embodiment, the threshold value(s) may be dynamic and may vary over time, such as from interval to interval, such as based on market activity, e.g. volume or volatility.

It will be appreciated that the comparative values and/or the threshold values may be configured such that a comparison subsequent to the elapse of the duration of time may not cause a result different from than had the comparison been performed just prior to the elapse of the duration of time. For example, it may be desirable to configure the comparative and/or threshold values such that an incoming order received after the end of an interval would cause the same result as if that order had been received just prior to the end of that interval.

The transaction integrity module may perform an action when any of the determined differences deviate the threshold value. That is, if the market moved too far, up or down, too fast, e.g. the slope or gradient of the movement (or angular or other measure thereof) versus the time over which the movement is measured is too steep, positive or negative, it is determined that a qualifying event has occurred, referred to as a "Velocity Logic Event," and one or more actions may be take or caused to be taken.

In one embodiment, the action may include placement of the market for the product in a reserved state, as was described above, such as for a limited time period which may be configurable and may be a static or dynamic value and may vary among markets. In one embodiment, if during the reserved state additional conditions, such as based on whether the market is recovering to a normal operating state or not as the reserved state is nearing an end, are met, the time limit for staying in reserved state may be extended. Alternatively, or in addition thereto, the action may include transmission of an alert to an operator of the exchange, such as the GCC of the CME, a trader of the product, or a combination thereof. Alerts may be sent as market data. Where the market is placed in a reserved state, the alert may further advise the recipient of this state. A subsequent message may then be sent when the market is taken out of the reserved state or if the reserved state is extended. Alternatively, or in addition thereto, the action may include permanent or temporary enablement of trading opportunities for the product in a different market. For example, implied markets for which the current product may be a leg, etc. may be enabled to create additional matching opportunities, i.e. additional liquidity. Alternatively, or in addition thereto, the action may include permanent or temporary prevention of trading of the product at a price outside of a price limit, i.e. a ceiling or floor. If the detected extreme movement is downward, the limit may set as a limit below which trading is not allowed, e.g. a floor. Alternatively, if the detected extreme movement of the market is upward, the limit may be set as a limit above which trading is not allowed, e.g. a ceiling. In one embodiment, if orders to trade are subsequently received substantially close to, or at, or otherwise within a threshold of, the limit, the limit may be periodically raised (or lowered), such as after a defined delay period, to gradually allow a market, intent on reaching a particular price, to eventually reach the price in a controlled manner, e.g. the market is slowed down.

Alternatively, or in addition thereto, the action may include modifying the matching/allocation algorithm used to allocate incoming orders to resting orders. For example, if the current matching algorithm is First-In-First-Out ("FIFO"), also referred to as Price-Time, the algorithm may be changed to Pro-Rata. Other algorithms which may be used include Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, Split Price-Time Pro-Rata. See, for example, U.S. patent application Ser. No. 13/534,399 entitled "Multiple Trade Matching Algorithms" herein incorporated by reference in its entirety and relied upon.

In one embodiment, the transaction integrity module may receive the duration of time, the threshold time and the threshold value, or other parameters which control the operation of the transaction integrity modules, such as from the operator of the exchange computer system, e.g. the GCC of CME. These configurable parameters include: which markets to be monitored if not all markets, such as where performance constraints limit deployment or where it may be determined that some markets are not susceptible to the problems described herein and therefore need not be monitored; the comparison value (which may be referred to below as the VL Price or Trade Price), such as which parameter of the market should be used during the operation of the transaction integrity module and/or the initial value thereof, which may be specified as a dollar amount, tick value or other metric; the comparative values (which may be referred to below as the VL Ref Low and VL Ref High values), such as which parameter(s) of the market should be used during the operation of the transaction integrity module and/or the initial value(s) thereof, which may be specified as a dollar amount, tick value or other metric; the duration of time or interval (which may be referred to below as the Time Slice Length) and may be specified as a number of seconds or milliseconds; the threshold time or window (which may be referred to below as the Time Slice Count or number of intervals or alternatively as the Time Slice Count*Time Slice Length) and may be specified as a number of intervals or a length of time, in seconds or milliseconds for example, and may be a multiple of the duration of time/interval/Time Slice Length; the threshold value (which may be referred to below as the VL Value); the action(s) to be taken; the time limit for keeping a market in a reserved state; or other parameters. It will be appreciated that any or all of these parameters may be statically defined for application to all markets, may vary from market to market and/or may be dynamically configured/re-configured during operation, either automatically responsive to market conditions or manually, e.g. by the operator of the exchange computer system 100.

Figure 11:
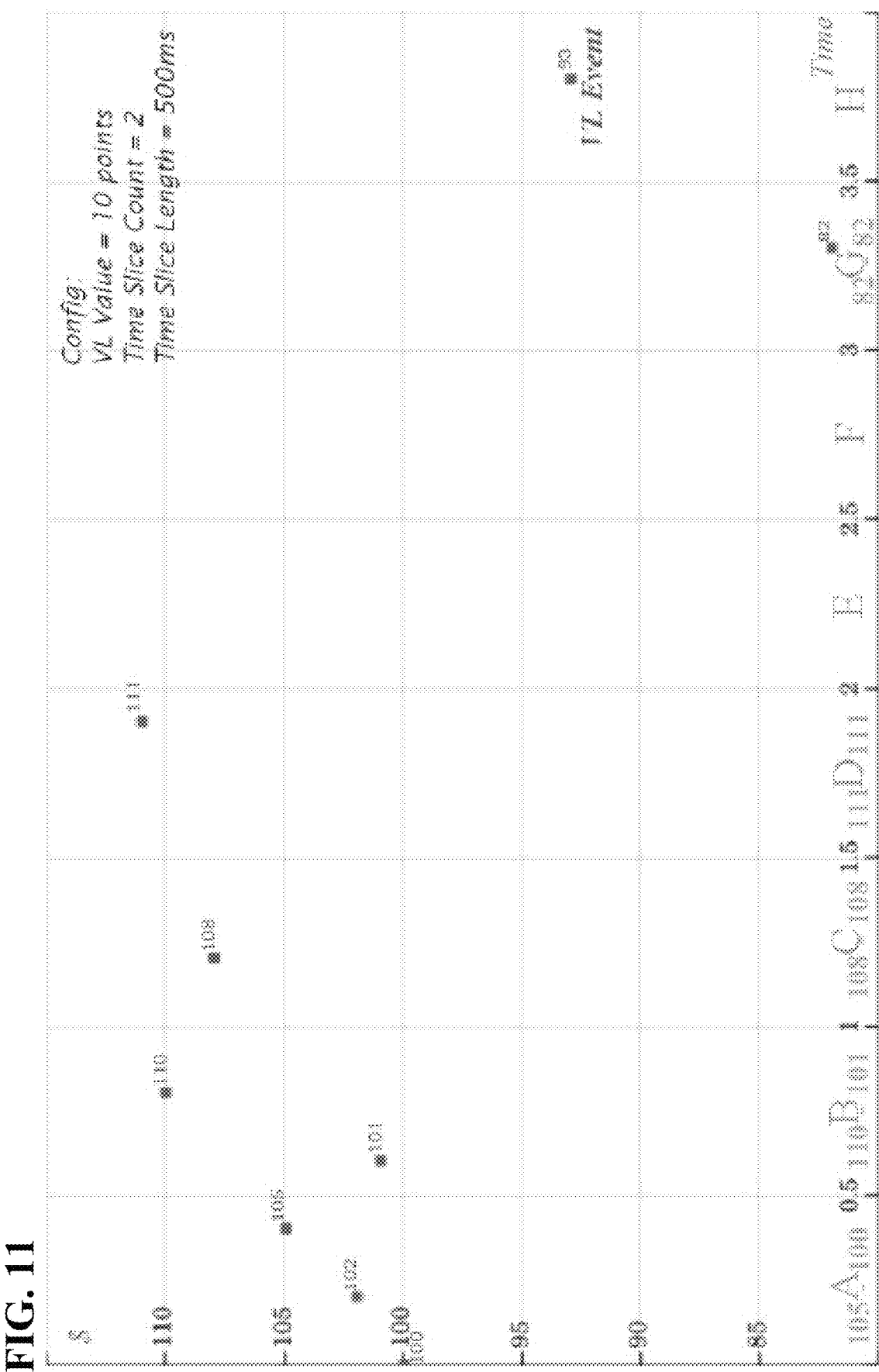
FIG. 11 depicts an example of an event detected according to an example transaction integrity modules.

FIG. 11 illustrates an example plot showing an incoming message value 93 that falls outside of defined threshold range after performing the requisite comparisons and accordingly raises, e.g., an action such as placing the market for the product in a reserved state.

The exchange computing system is typically configured to process incoming messages as discussed herein with reference to FIG. 1. However, if the exchange computing system receives an order or message to trade product at a value or price that violates the conditions defined herein, transaction integrity modules may take, or otherwise cause, a different action. This action may include alerting the operator of the electronic trading system or exchange, such as the GCC of the CME, placing the market in a reserved state whereby orders may be received and price discovery may occur but matching of trades is otherwise suspended, or institute one or more temporary or permanent limits, such as price limits, e.g. a maximum price and/or minimum price, wherein only trades at prices within the limit(s) are allowed, or combinations thereof. In an alternate embodiment, other actions may include enabling additional liquidity, i.e. trading opportunities, for the particular product, such as by temporarily or permanently enabling implied opportunities whereby, for example, additional liquidity may be found in markets for combination products, e.g. spreads, involving the particular product.

With respect to placing the market in a reserved or paused state, while an instrument may not trade when it is reserved, price discovery may still occur, e.g. an indicative opening price of that instrument may be derived and disseminated to the market. The indicative opening price may reflect the price the instrument would be trading at if the market were open. Placing an instrument in a reserved state allows market participants to enter additional orders that adjust the indicative opening price to a level that reflects buyers competing with other buyers and sellers vying against other sellers. The present embodiments may temporarily suspend trading until the market is adjusted within a threshold range, or when a period of time lapses. The period of time may vary in length in relation to the time of day, the product traded, market volatility and/or any other relevant market condition or combination of market conditions. Similarly, the threshold range may vary by the product and/or the time of day. It will be appreciated that the indicative opening price determined when the market is taken out of the reserved state, or a sampled, derived or measured value thereof, may be used as the initial comparative value(s) by transaction integrity modules as described above upon resumption of trading.

Because market participants may not be aware that a product or an instrument is reserved due to the large volume of messages sent over an electronic trading system or because the market participants are no longer trading, the present system and method also may encompass independent communication systems to convey information, warnings, or alerts about an instrument in a reserved state. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of the state of the market in a narrow timeframe. It will be appreciated that the length of time for which the market may be temporarily held in a reserved state is implementation dependent and may be configurable, statically or dynamically, and further may vary from market to market. Once the market is reopened, or otherwise taken out of reserved state, transaction integrity modules may be re-enabled to continue monitoring the market as described herein.

It will be appreciated that some systems designed to detect and respond to extreme market changes may respond by merely setting a hard price limit, i.e. minimum or maximum depending upon the direction of the extreme movement, only within which trades are allowed to occur. However, setting either a maximum or minimum price limit and continuing to allow trading may not address the underlying problem which caused the extreme market movement and the market may reverse and undergo an extreme movement away from the set limit, such as due to the reaction of algorithmic trading systems. In contrast, transaction integrity modules may place the market in a reserved state whereby trades are not allowed but price discovery can still occur. This effectively slows down the market and enables traders to analyze the market and temper their reactions thereto.

In one embodiment, the action may include placement of the market for the product in a reserved state, as was described above, such as for a limited time period which may be configurable and may be a static or dynamic value and may vary among markets. In one embodiment, if during the reserved state additional conditions, such as based on whether the market is recovering to a normal operating state or not as the reserved state is nearing an end, are met, the time limit for staying in reserved state may be extended. Alternatively, or in addition thereto, the action may include transmission of an alert to an operator of the exchange, such as the GCC of the CME, a trader of the product, or a combination thereof. Alerts may be sent as market data. Where the market is placed in a reserved state, the alert may further advise the recipient of this state. A subsequent message may then be sent when the market is taken out of the reserved state or if the reserved state is extended. Alternatively, or in addition thereto, the action may include permanent or temporary enablement of trading opportunities for the product in a different market. For example, implied markets for which the current product may be a leg, etc. may be enabled to create additional matching opportunities, i.e. additional liquidity. Alternatively, or in addition thereto, the action may include permanent or temporary prevention of trading of the product at a price outside of a price limit, i.e. a ceiling or floor. If the detected extreme movement is downward, the limit may set as a limit below which trading is not allowed, e.g. a floor. Alternatively, if the detected extreme movement of the market is upward, the limit may be set as a limit above which trading is not allowed, e.g. a ceiling. In one embodiment, if orders to trade are subsequently received substantially close to, or at, or otherwise within a threshold of, the limit, the limit may be periodically raised (or lowered), such as after a defined delay period, to gradually allow a market, intent on reaching a particular price, to eventually reach the price in a controlled manner, e.g. the market is slowed down.

Upon reserving the market for a product, transaction integrity modules may release the market (i.e., resume allowing matching) as described in U.S. Pat. No. 8,924,278 entitled "System and method for controlling markets during a stop loss trigger", the entire disclosure of which is incorporated by reference herein and relied upon. Alternatively, transaction integrity modules may release the market (i.e., resume allowing matching) as described in the '936 Patent.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for optimizing processing of electronic data multiple transaction request messages, the method comprising:
    receiving, by an optimization processor, an electronic data multiple transaction request message including a plurality of electronic data transaction requests, each of the electronic data transaction requests requesting performance of a same type of transaction for a quantity of the same data object at a value, the electronic data transaction requests sorted by value for each transaction type from the electronic data transaction request associated with a best value to the electronic data transaction request associated with the worst value;
    determining, automatically by the optimization processor, whether only the electronic data transaction request associated with the best value will be rejected by a transaction integrity module of the data transaction processing system; and
    upon the determination, by the optimization processor, that the electronic data transaction request associated with the best value will be rejected by the transaction integrity module, rejecting, by the optimization processor, the plurality of electronic data transaction requests;
    upon the determination, by the optimization processor, that the electronic data transaction request associated with the best value will not be rejected by the transaction integrity module, determining, by the optimization processor, whether an attempt to match the electronic data transaction request associated with the best value with at least one previously received but unsatisfied electronic data transaction request for a transaction which is counter thereto results in at least partial satisfaction of one or both of the electronic data transaction request associated with the best value and the at least one previously received but unsatisfied electronic data transaction request; and
    upon the determination, by the optimization processor, that the attempt to match the electronic data transaction request associated with the best value with at least one previously received but unsatisfied electronic data transaction request for a transaction which is counter thereto will not result in at least partial satisfaction of one or both of the electronic data transaction request associated with the best value and the at least one previously received but unsatisfied electronic data transaction request, storing, by the optimization processor, data associated with the plurality of electronic data transaction requests in an order book object associated with the data object; and
    wherein the optimization processor rejects the electronic data transaction requests other than the electronic data transaction request associated with the best value without performing the determining as to whether any of the electronic data transaction requests other than the electronic data transaction request associated with the best value will be rejected by the transaction integrity module, a number of electronic data transaction requests for which the determining is performed thereby being reduced.

2. The computer implemented method of claim 1, wherein determining, by the optimization processor, whether the electronic data transaction request associated with the best value will be rejected by the transaction integrity module comprises comparing the electronic data transaction request associated with the best value to a banding threshold defining an allowable value range.

3. The computer implemented method of claim 1, wherein determining, by the optimization processor, whether the electronic data transaction request associated with the best value will be rejected by the transaction integrity module comprises determining whether the best value fails velocity logic processing.

4. The computer implemented method of claim 1, wherein the optimization processor stores the data associated with the electronic data transaction requests other than the electronic data transaction request associated with the best value in the order book object associated with the data object without determining whether an attempt to match any of the electronic data transaction requests other than the electronic data transaction request associated with the best value with at least one previously received but unsatisfied electronic data transaction request for a transaction which is counter thereto results in at least partial satisfaction of one or both of any of the electronic data transaction requests other than the electronic data transaction request associated with the best value and the at least one previously received but unsatisfied electronic data transaction request.

5. The computer implemented method of claim 1, wherein if the type of transaction is to relinquish the data object, the electronic data transaction request associated with the best value is the electronic data transaction request associated with the smallest value, and the electronic data transaction request associated with the worst value is the electronic data transaction request associated with the largest value.

6. The computer implemented method of claim 1, wherein if the type of transaction is to acquire the data object, the electronic data transaction request associated with the best value is the electronic data transaction request associated with the largest value, and the electronic data transaction request associated with the worst value is the electronic data transaction request associated with the smallest value.

7. The computer implemented method of claim 1, wherein the plurality of electronic data transaction requests is a first plurality of electronic data transaction requests, wherein the type of transaction for each of the first plurality of electronic data transaction requests is to acquire the data object, and wherein the electronic data multiple transaction request message includes a second plurality of electronic data transaction requests, each of the second plurality of electronic data transaction requests requesting relinquishing a quantity of the data object at a value, the method further comprising:

determining whether all of the values associated with the first plurality of electronic data transaction requests are less than all of the values associated with the second plurality of electronic data transaction requests, and determining whether the electronic data transaction request associated with the best value for acquiring the data object is greater than a lead acquisition value stored in an order book object for the data object; and upon determining that all of the values associated with the first plurality of electronic data transaction requests are less than all of the values associated with the second plurality of electronic data transaction requests, and that the electronic data transaction request associated with the best value for acquiring the data object is greater than the lead acquisition value, storing, by the optimization processor, data associated with the second plurality of electronic data transaction requests in the order book object associated with the data object.

8. The computer implemented method of claim 7, wherein the optimization processor stores the data associated with the second plurality of electronic data transaction requests in the order book object associated with the data object without determining whether an attempt to match any of the second plurality of electronic data transaction requests with at least one previously received but unsatisfied electronic data transaction request to acquire the data object results in at least partial satisfaction of one or both of any of the second plurality of electronic data transaction requests and the at least one previously received but unsatisfied electronic data transaction request.

9. The computer implemented method of claim 8, wherein the lead acquisition value is the best value from a plurality of previously received but unsatisfied electronic data transaction requests to acquire the data object.

10. The computer implemented method of claim 1, wherein upon determining that the electronic data multiple transaction request message includes an atomic instruction, the optimization processor determines whether, for each of the plurality of the electronic data transaction requests, an attempt to match the electronic data transaction request with at least one previously received but unsatisfied electronic data transaction request for a transaction which is counter thereto results in at least partial satisfaction of one or both of the electronic data transaction request and the at least one previously received but unsatisfied electronic data transaction request; and upon determining, by the optimization processor, that, for each of the plurality of the electronic data transaction requests, the attempt to match the electronic data transaction request with at least one previously received but unsatisfied electronic data transaction request for a transaction which is counter thereto results in at least partial satisfaction of one or both of the electronic data transaction request and the at least one previously received but unsatisfied electronic data transaction request, matching each of the plurality of the electronic data transaction requests with the at least one previously received but unsatisfied electronic data transaction request.

11. The computer implemented method of claim 10, wherein the optimization processor matches each of the plurality of the electronic data transaction requests with the at least one previously received but unsatisfied electronic data transaction request before attempting to match any other electronic data transaction request not in the electronic data multiple transaction request message.

12. The computer implemented method of claim 1, wherein the data object is a first data object and the plurality of electronic data transaction requests is a first plurality of electronic data transaction requests, and wherein the electronic data multiple transaction request message includes a third plurality of electronic data transaction requests associated with a second data object.

13. A computer system for optimizing processing of electronic data multiple transaction request messages, the computer system comprising:

an optimization processor configured to cause the computer system to:

receive an electronic data multiple transaction request message including a plurality of electronic data transaction requests, each of the electronic data transaction requests requesting performance of a same type of transaction for a quantity of the same data object at a value, the electronic data transaction requests sorted by value for each transaction type from the electronic data transaction request associated with a best value to the electronic data transaction request associated with the worst value;

determine, automatically, whether only the electronic data transaction request associated with the best value will be rejected by a transaction integrity module of the data transaction processing system; and upon the determination that the electronic data transaction request associated with the best value will be rejected by the transaction integrity module, reject the plurality of electronic data transaction requests;

upon the determination that the electronic data transaction request associated with the best value will not be rejected by the transaction integrity module, determine whether an attempt to match the electronic data transaction request associated with the best value with at least one previously received but unsatisfied electronic data transaction request for a transaction which is counter thereto results in at least partial satisfaction of one or both of the electronic data transaction request associated with the best value and the at least one previously received but unsatisfied electronic data transaction request;

upon the determination that the attempt to match the electronic data transaction request associated with the best value with at least one previously received but unsatisfied electronic data transaction request for a transaction which is counter thereto will not result in at least partial satisfaction of one or both of the electronic data transaction request associated with the best value and the at least one previously received but unsatisfied electronic data transaction request, store data associated with the plurality of electronic data transaction requests in an order book object associated with the data object; and wherein the optimization processor rejects the electronic data transaction requests other than the electronic data transaction request associated with the best value without performing the determining as to whether any of the electronic data transaction requests other than the electronic data transaction request associated with the best value will be rejected by the transaction integrity module, a number of electronic data transaction requests for which the optimization processor performs the determining thereby being reduced.

14. The computer system of claim 13, wherein if the type of transaction is to relinquish the data object, the electronic data transaction request associated with the best value is the electronic data transaction request associated with the smallest value, and the electronic data transaction request associated with the worst value is the electronic data transaction request associated with the largest value.

15. The computer system of claim 13, wherein if the type of transaction is to acquire the data object, the electronic data transaction request associated with the best value is the electronic data transaction request associated with the largest value, and the electronic data transaction request associated with the worst value is the electronic data transaction request associated with the smallest value.

16. The computer system of claim 13, wherein the plurality of electronic data transaction requests is a first plurality of electronic data transaction requests, wherein the type of transaction for each of the first plurality of electronic data transaction requests is to acquire the data object, wherein the electronic data multiple transaction request message includes a second plurality of electronic data transaction requests, each of the second plurality of electronic data transaction requests requesting relinquishing a quantity of the data object at a value, and wherein the optimization processor is further configured to cause the computer system to:
- determine whether all of the values associated with the first plurality of electronic data transaction requests are less than all of the values associated with the second plurality of electronic data transaction requests, and determine whether the electronic data transaction request associated with the best value for acquiring the data object is greater than a lead acquisition value stored in an order book object for the data object; and
- upon determining that all of the values associated with the first plurality of electronic data transaction requests are less than all of the values associated with the second plurality of electronic data transaction requests, and that the electronic data transaction request associated with the best value for acquiring the data object is greater than the lead acquisition value, store data associated with the second plurality of electronic data transaction requests in the order book object associated with the data object.

17. A computer system comprising:
- means for receiving an electronic data multiple transaction request message including a plurality of electronic data transaction requests, each of the electronic data transaction requests requesting performance of a same type of transaction for a quantity of the same data object at a value, the electronic data transaction requests sorted by value for each transaction type from the electronic data transaction request associated with a best value to the electronic data transaction request associated with the worst value;
- means for automatically determining whether only the electronic data transaction request associated with the best value will be rejected by a transaction integrity module of the data transaction processing system; and
- upon the determination, by the mean for automatically determining, that the electronic data transaction request associated with the best value will be rejected by the transaction integrity module, means for rejecting the plurality of electronic data transaction requests;
- upon the determination, by the means for automatically determining, that the electronic data transaction request associated with the best value will not be rejected by the transaction integrity module, means for determining, by the optimization processor, whether an attempt to match the electronic data transaction request associated with the best value with at least one previously received but unsatisfied electronic data transaction request for a transaction which is counter thereto results in at least partial satisfaction of one or both of the electronic data transaction request associated with the best value and the at least one previously received but unsatisfied electronic data transaction request; and
- upon the determination, by the means for automatically determining, that the attempt to match the electronic data transaction request associated with the best value with at least one previously received but unsatisfied electronic data transaction request for a transaction which is counter thereto will not result in at least partial satisfaction of one or both of the electronic data transaction request associated with the best value and the at least one previously received but unsatisfied electronic data transaction request, means for storing, by the optimization processor, data associated with the plurality of electronic data transaction requests in an order book object associated with the data object; and
- wherein the means for rejecting rejects the electronic data transaction requests other than the electronic data transaction request associated with the best value without means for automatically determining performing the determination as to whether any of the electronic data transaction requests other than the electronic data transaction request associated with the best value will be rejected by the transaction integrity module, a number of electronic data transaction requests for which the means for automatically determining performs the determination thereby being reduced.

* * * * *